US008491074B2

(12) United States Patent
Miyazaki et al.

(10) Patent No.: US 8,491,074 B2
(45) Date of Patent: Jul. 23, 2013

(54) DRIVING CIRCUIT FOR FLUID JET HEAD, DRIVING METHOD FOR FLUID JET HEAD, AND FLUID JET PRINTING APPARATUS

(75) Inventors: Shinichi Miyazaki, Suwa (JP); Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 714 days.

(21) Appl. No.: 12/605,460

(22) Filed: Oct. 26, 2009

(65) Prior Publication Data

US 2010/0103211 A1 Apr. 29, 2010

(30) Foreign Application Priority Data

Oct. 27, 2008 (JP) ................................ 2008-275231

(51) Int. Cl.
*B41J 29/38* (2006.01)
*B41J 2/16* (2006.01)
*B41J 2/045* (2006.01)
*H02J 1/00* (2006.01)

(52) U.S. Cl.
USPC .................... 347/10; 347/50; 347/68; 307/70

(58) Field of Classification Search
USPC ............................ 347/10, 57, 68, 50; 307/70
See application file for complete search history.

(56) References Cited

U.S. PATENT DOCUMENTS

| | | | | |
|---|---|---|---|---|
| 6,454,377 | B1 * | 9/2002 | Ishizaki | 347/15 |
| 6,929,340 | B2 | 8/2005 | Ishizaki | |
| 8,049,368 | B2 * | 11/2011 | Miyazaki et al. | 307/70 |
| 2008/0238964 | A1 * | 10/2008 | Umeda | 347/10 |

FOREIGN PATENT DOCUMENTS

| | | |
|---|---|---|
| JP | 57203563 A * | 12/1982 |
| JP | 07-178907 | 7/1995 |
| JP | 2002-210958 | 7/2002 |
| JP | 2003-285441 | 10/2003 |
| JP | 2008-238641 | 10/2008 |

* cited by examiner

*Primary Examiner* — Stephen Meier
*Assistant Examiner* — Sarah Al Hashimi
(74) *Attorney, Agent, or Firm* — Maschoff Brennan

(57) ABSTRACT

An ejection head driving circuit that supplies a driving voltage waveform to an ejection head has ejection nozzles that cause fluid to be ejected. A target voltage waveform output unit outputs a target voltage waveform to the ejection head. Power source units generate electric power at different voltage values. Negative feedback control units supply electric power from the respective power source units to the ejection head and perform a negative feedback control of the voltage values so that the voltage value to be applied to the ejection head matches the target voltage waveform. A power source connecting unit selects one of the power source units on the basis of the voltage value applied to the ejection head or the voltage value of the target voltage waveform, connects the selected power source unit to the ejection head, and disconnects the remaining power source units from the ejection head.

3 Claims, 15 Drawing Sheets

FIG. 5A
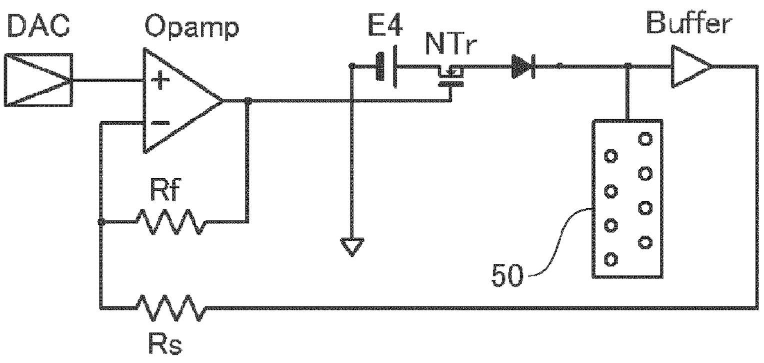
FIG. 5B
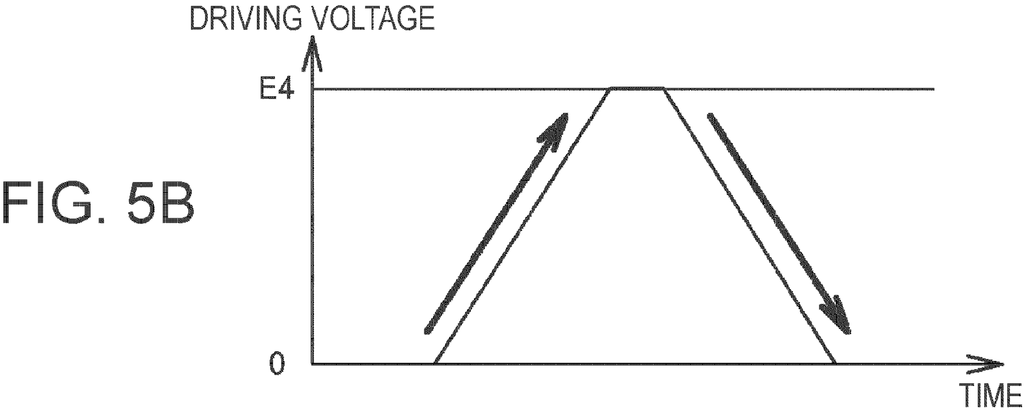
FIG. 6A
FIG. 6B
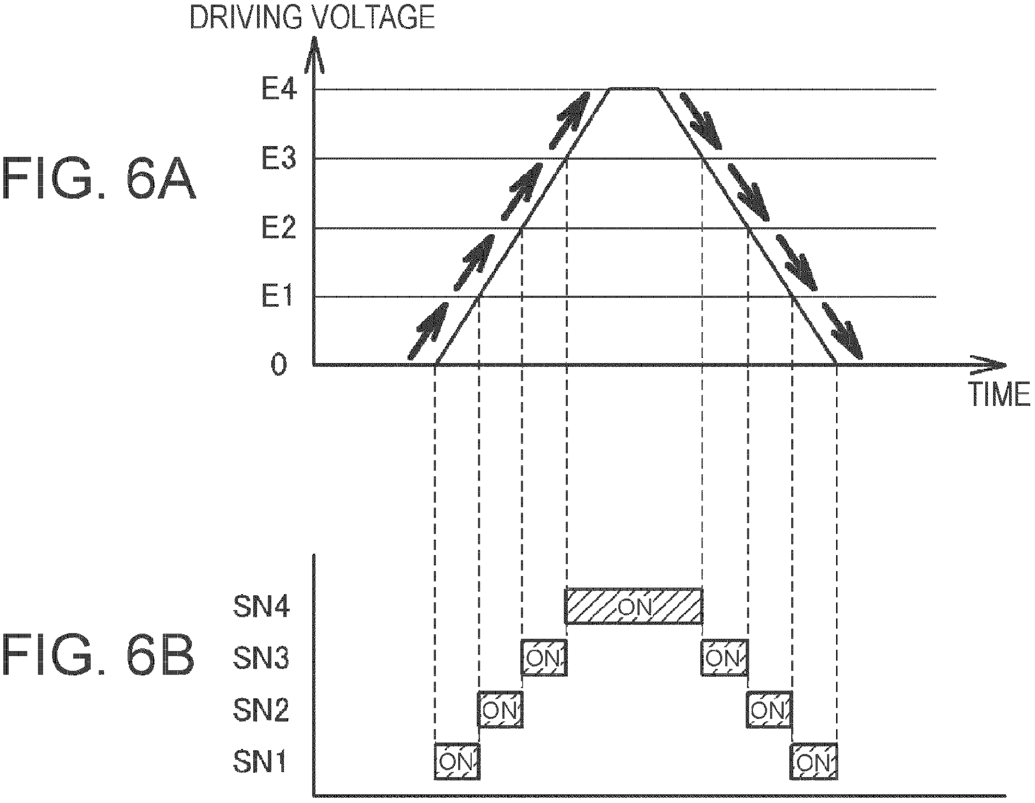

| | OPERATING STATE | NTr | PTr |
|---|---|---|---|
| NO POWER LOADING | $E_n$ NTr PTr | OFF | OFF |
| POWER LOADING | $E_{n+1}$ NTr PTr 50 $E_n$ NTr PTr | ON | AMPLIFI-CATION CONTROL |
| POWER RECOVERY | $E_{n+1}$ NTr PTr 50 $E_n$ NTr PTr | AMPLIFI-CATION CONTROL | ON |

DRIVING CIRCUIT FOR FLUID JET HEAD, DRIVING METHOD FOR FLUID JET HEAD, AND FLUID JET PRINTING APPARATUS

This application claims priority to Japanese Patent Application No. 2008-275231 filed on Oct. 27, 2008, and the entire disclosure thereof is incorporated herein by reference.

BACKGROUND

1. Technical Field

The present invention relates to a technique to discharge fluid from an ejection head having minute ejection nozzles by supplying a driving voltage waveform to the ejection head.

2. Related Art

So-called an ink-jet printer is capable of printing a high-quality image by discharging ink of an accurate amount to accurate positions from minute ejection nozzles, and is nowadays widely used. It is also considered to be possible to manufacture various minute components such as electrodes, sensors, or biochips by discharging various types of fluid instead of ink toward a substrate using this technique.

In the technique as described above, a specific ejection head is employed so as to enable discharge of fluid such as ink by an accurate amount at accurate positions. Although there are several methods as methods of driving the ejection head, a method of deforming minute fluid chambers provided in the interior of the ejection head by actuators, and causing the fluid in the fluid chambers to be discharged from the ejection nozzles by using the capacity change of the fluid chambers at that moment is known as a representative method. As the actuator, a piezoelectric element is widely used because it has a high responsiveness and is able to generate strong force.

In order to print an image quickly while maintaining the quality, it is necessary to discharge the ink at a high repetition frequency while maintaining the accuracy in the amount and the position of the ink to be discharged. Therefore, employing a driving voltage waveform to be applied to the actuator such as the piezoelectric element, which has a trapezoidal shape in which a rising portion and a lowering portion of the voltage are sloped, instead of a driving waveform having a simple rectangular waveform is contemplated (JP-A-7-178907).

However, when an attempt is made to apply the trapezoidal-shaped driving waveform in order to discharge the fluid of an accurate amount at the high repetition frequency, the following problems arise. In a step of generating the driving voltage waveform to be applied, there is a problem such that a large power loss occurs in order to generate a voltage waveform which changes in a sloped manner at the rising or the lowering portion of the waveform. When the actuator includes a capacity component as in the case of the piezoelectric element, there is also a problem such that a reactive power for charging and discharging electricity with respect to the capacity components of the actuator is consumed on the side of the driving voltage waveform generating circuit, and hence the power efficiency is further lowered. Furthermore, since the dissipated power is transformed into heat, it is required to release heat from the driving voltage waveform generating circuit, resulting in a larger circuit.

SUMMARY

An advantage of some aspects of the invention is to provide an ejection head driving technique which achieves high power efficiency and enables downsizing of the apparatus.

According to a first aspect of the invention, an ejection head driving circuit configured to supply a driving voltage waveform to an ejection head provided with ejection nozzles for ejecting fluid includes a target voltage waveform output unit configured to output a target voltage waveform to supply to the ejection head, a plurality of power source units configured to generate electric powers having different voltage values, a plurality of negative feedback control units configured to supply the electric powers from the respective power source units to the ejection head and perform a negative feedback control of the voltage values so that the applied voltage value to the ejection head matches with the target voltage waveform, and a power source connecting unit configured to connect one of the power source units to connect to the ejection head based on the applied voltage value or the voltage value of the target voltage waveform, and disconnect the other power source units from the ejection head.

According to a second aspect of the invention, a method of driving an ejection head by supplying a driving voltage waveform to the ejection head provided with ejection nozzles to eject fluid includes outputting a target voltage waveform to be supplied to the ejection head, the target voltage waveform including a voltage increasing portion in which a voltage value increases as time elapses, a voltage maintaining portion in which the voltage value stays, and a voltage decreasing portion in which the voltage value decreases as time elapses, generating electric powers of different voltage values from a plurality of power source units, selecting one of the plurality of power source units on the basis of the applied voltage value to the ejection head or the voltage value of the target voltage waveform and performing a negative feedback control on the voltage value received from the selected power source unit so that the applied voltage value to the ejection head matches with the target voltage waveform.

In the ejection head driving circuit and the method of driving an ejection head according to the aspects of the invention, the target voltage waveform to be supplied to the ejection head is stored in advance, and the target voltage waveform includes at least the voltage incrementing portion in which the voltage value is increased with the elapse of time, the voltage maintaining portion in which the voltage value is maintained, and the voltage decrementing portion in which the voltage value is decreased with the elapse of time. Also, the plurality of power source units which generate the electric powers having the voltage values different from each other are provided, and the negative feedback control units are provided for the respective power source units, and the target voltage waveform is inputted to the respective negative feedback control unit.

Consequently, in the respective negative feedback control units, the electric powers received from the respective power source units can be supplied to the ejection head while performing the negative feedback control according to the target voltage waveform. Then, one of the plurality of power source units (and the negative feedback control units) configured as described above is selected on the basis of the voltage value applied to the ejection head or the voltage value of the target voltage waveform, and is connected to the ejection head, and the remaining power source units (and the negative feedback control units) are disconnected from the ejection head.

When a trapezoidal driving voltage waveform is applied to the ejection head for discharging the fluid of an adequate amount at a high repetitive frequency, a large power loss occurs on the side of the circuit which generates the driving voltage waveform and, in addition, the apparatus needs to be made larger as a result of the heat-releasing measure taken in association with the power loss. In contrast, by driving the ejection head while switching among the plurality of power source units which generate the electric powers having different voltage values, the potential difference between the voltage value generated by the power source unit and the voltage value applied to the ejection head can be made smaller, so that the power consumption when driving the ejection head can be reduced.

Preferably, the power source units which are capable of storing electric power from an external power source are used as the power source units, and the ejection head is driven as follows. The voltage value applied to the ejection head or the voltage value of the target voltage waveform is detected. Then a first power source unit which generates a voltage value higher than the detected voltage value and a second power source unit which generates a voltage value lower than the detected voltage are selected. The ejection head is driven by being connected to the first power source unit when the voltage value applied to the ejection head is lower than the voltage value of the target voltage waveform or to the second power source unit when higher, and disconnecting the remaining power source units from the ejection head.

In this configuration, when the voltage value applied to the ejection head is higher than the target voltage waveform, the voltage value can get close to the target voltage waveform quickly by having the electric power applied to the ejection head collected by the power source unit having a low output voltage value. In contrast, when the voltage value applied to the ejection head is lower than the target voltage waveform, the voltage value can get close to the target voltage waveform quickly by having the electric power supplied from the power source unit having a high output voltage value to the ejection head. Therefore, the ejection head can be driven with an accurate driving voltage waveform.

In the ejection head driving circuit, preferably, the ejection head is driven in the following manner. The power source unit which is able to store electric power from an external power source is employed. Also, a load which is able to store electric power from an external power source is connected in parallel with the ejection head on the downstream of the power source connecting unit when viewed from the power source unit. Then, when the power source unit to be connected to the ejection head is selected on the basis of the voltage value applied to the ejection head or the voltage value of the target voltage waveform, the selected power source unit is connected to the ejection head and the load, and other power source units are disconnected from the ejection head and the load.

The plurality of ejection nozzles are provided on the ejection head, and there may be cases where all, some or none of the ejection nozzles are driven simultaneously. From this reason, the operating environment of the driving circuit which supplies the driving voltage waveform to the ejection head fluctuates depending on the state of usage of the ejection head. In order to reduce the effect of the operating environment to enable a stable supply of the driving voltage waveform, it is necessary to secure a sufficient reserve capacity in the driving circuit, resulting in complication or upsizing of the driving circuit. In contrast, by connecting the load which is capable of storing the electric power from an external power source parallel to the ejection head, even though the state of usage of the ejection head fluctuates, the operating environment of the driving circuit which supplies the driving voltage waveform does not fluctuate significantly. Therefore, it is not necessary to secure the reserve capacity in the driving circuit, and hence the constantly stable driving voltage waveform can be supplied without the complication or the upsizing of the driving circuit.

The capacity of the load connected in parallel to the ejection head may be configured to be changeable according to the state of usage of the ejection head. For example, it is also possible to increase the capacity of the load with decrease of the number of the ejection nozzles to be driven or decrease the capacity of the load with increase of the number of the ejection nozzles to be driven. In this manner, by changing the capacity of the load so as to cancel the fluctuation of the load capacity of the ejection head, the fluctuation of the load for the driving circuit can be reduced. Consequently, the ejection head can be driven using the stable driving voltage waveform while downsizing the driving circuit.

BRIEF DESCRIPTION OF THE DRAWINGS

The invention will be described with reference to the accompanying drawings, wherein like numbers reference like elements.

FIGS. 5A and 5B are explanatory drawings illustrating a comparative ejection head driving circuit which drives the load using a single power source and a single negative feedback circuit.

FIGS. 6A and 6B are explanatory drawings showing reasons why power consumption is reduced by reducing an operational potential difference in the ejection head driving circuit according to the first embodiment.

DESCRIPTION OF EXEMPLARY EMBODIMENTS

In the following description, in order to clarify contents of the invention according to the present application described above, embodiments will be described in the following order.

A. Summary of Embodiments

B. First Embodiment (embodiment in which an effect of a reduction of an operational potential difference is used)

B-1. Configuration of Ejection Head Driving Circuit

B-2. Operation of Ejection Head Driving Circuit

C. Second Embodiment (embodiment in which an effect of a reduction of an operational potential difference and an electric power recovery is used)

C-1. Configuration of Ejection Head Driving Circuit

C-2. Operation of Ejection Head Driving Circuit

D. Modified Embodiments

D-1. First Modified Embodiment

D-2. Second Modified Embodiment

D-3. Third Modified Embodiment

D-4. Fourth Modified Embodiment

D-5. Fifth Modified Embodiment

D-6. Sixth Modified Embodiment

A. Summary of Embodiments

Embodiments of various modes are conceivable for an ejection head driving circuit of the present invention, and the respective embodiments will be described below. However, in view of better understanding, summary common to the respective embodiments will be described briefly first.

Figure 1:
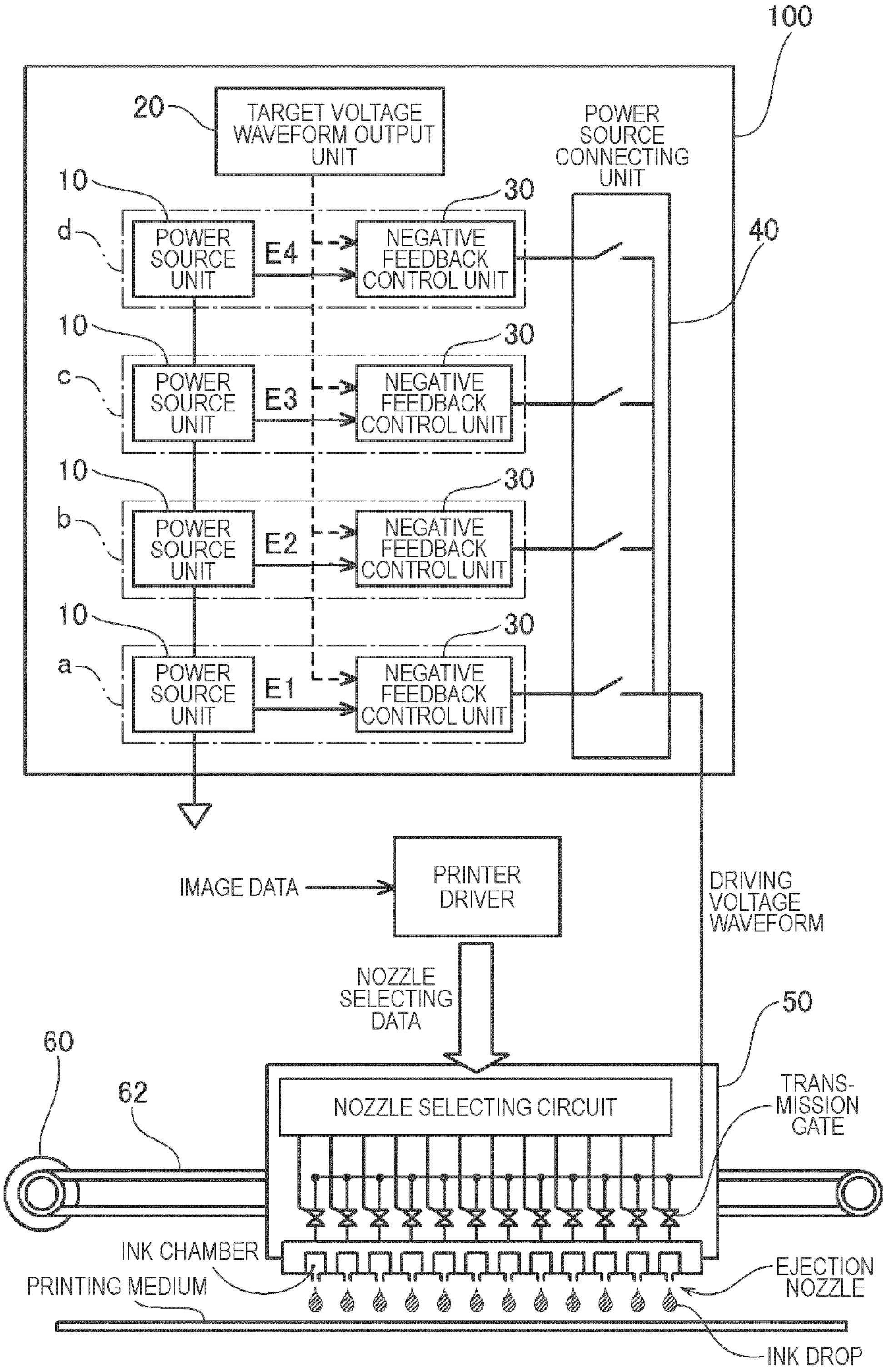
FIG. 1 is an explanatory drawing showing a rough configuration of an ejection head driving circuit according to an embodiment of the invention.

FIG. 1 is an explanatory drawing conceptually showing a state of driving an ejection head of an inkjet printer. As is known publicly, the inkjet printer includes an ejection head 50 configured to discharge ink drops mounted thereon. The ejection head 50 is connected to a scanning motor 60 via a scanning belt 62. Then, an image can be printed on a printing medium by driving the scanning motor 60 and causing the ejection head 50 to discharge the ink drops while moving the ejection head 50 relatively with respect to the printing medium (printing paper or the like).

FIG. 1 conceptually shows an internal configuration of the ejection head 50 as well. As illustrated, the ejection head 50 includes a plurality of ejection nozzles configured to discharge the ink drops, and ink chambers for the respective ejection nozzles. Also, piezoelectric elements, not shown, are provided for the respective ink chambers. When a voltage is applied to the piezoelectric elements in a state in which ink is supplied to the ink chambers, the ink chambers are deformed by the piezoelectric elements, so that the discharge of the ink in the ink chambers from the ejection nozzles is enabled according to a decrease in the volume at that time.

As described above, a driving voltage waveform having a specific waveform as described later is employed for the voltage to be applied to the respective piezoelectric elements in order to enable the discharge of the small ink drops at a high repetition frequency and in the same size with stability. The driving voltage waveform is generated by an ejection head driving circuit 100 described later, and is supplied to the piezoelectric elements of the respective ejection nozzles via transmission gates. A nozzle selecting circuit is connected to the transmission gates, and when the transmission gates are set to an ON state by the nozzle selecting circuit, the driving voltage waveform from the ejection head driving circuit 100 passes through the transmission gates and is supplied to the piezoelectric elements.

So-called a printer driver is connected to the nozzle selecting circuit. The printer driver, upon reception of image data of an image to be printed, determines at which pixels ink dots are to be formed by applying various kinds of image processing to the image data. Then, after having generated nozzle selecting data on the basis of the result of determination, the generated nozzle selecting data is outputted to the nozzle selecting circuit. The nozzle selecting circuit switches the transmission gates to the ON state or an OFF state according to the received nozzle selecting data. Consequently, only the ejection nozzles of the transmission gates set to the ON state are driven and eject the ink drops, so that the image on a printing medium is printed.

Figure 2:
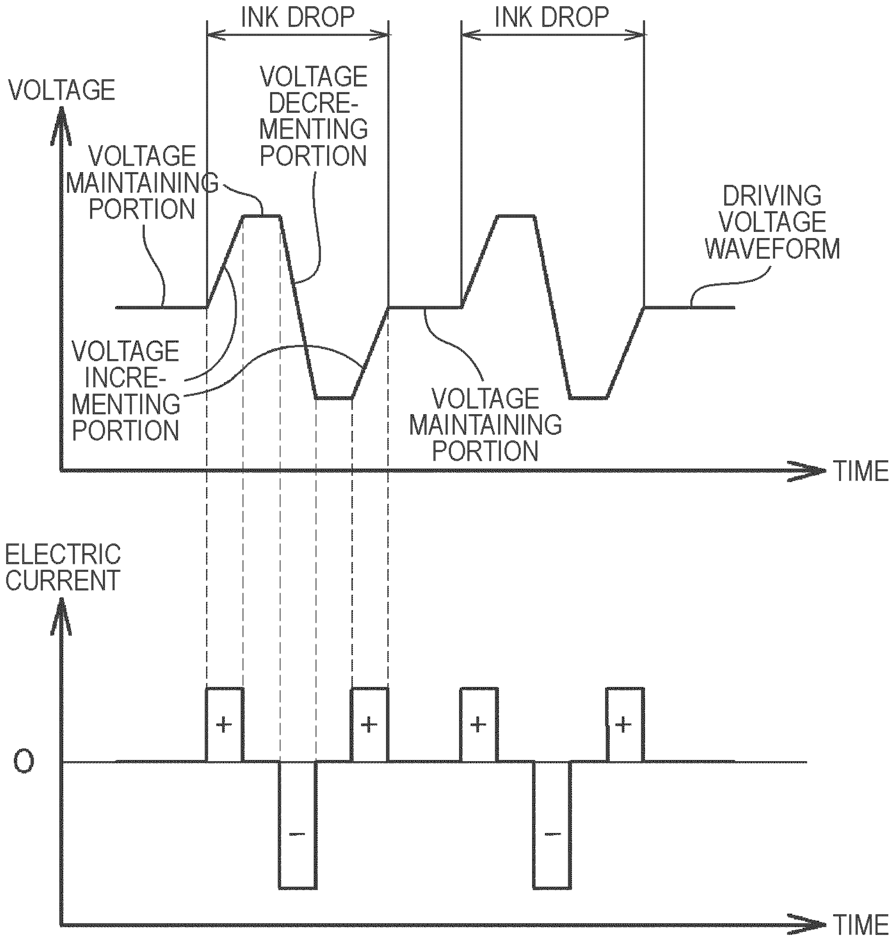
FIG. 2 is an explanatory drawing illustrating a driving voltage waveform to be supplied to an ejection head.

FIG. 2 is an explanatory drawing illustrating the driving voltage waveform for driving the ejection nozzles. In the illustrated driving voltage waveform, one each of ink drop that is, two ink drops in total can be discharged in a front half and a rear half of the waveform. Therefore, one ink drop is discharged when supplying only the front half or the rear half of the waveform to the piezoelectric elements through the transmission gates, and two ink drops are discharged when supplying the entire waveform to the piezoelectric elements therethrough. Then, when one ink drop is discharged, a small ink dot is formed on the printing medium, and when two ink drops are discharged, a large ink dot is formed. In this manner, ink dots having different sizes can be formed.

The driving voltage waveform includes, in detail, a voltage incrementing portion in which a voltage value is increased little by little with elapse of time, a voltage maintaining portion in which the voltage value is maintained at a constant value, and a voltage decrementing portion in which the voltage is decreased little by little with the elapse of time. The driving voltage waveform is not limited to the one including these portions only, but may include a portion where the voltage value changes in a staircase pattern, or may be a curved waveform. Here, in the voltage incrementing portion, the voltage value to be applied to the ejection head 50 is gradually increased, and a positive electric current flows to the ejection head 50. This means that an electric power is supplied (charged) to the ejection head 50. An electric power corresponding to the product of a potential difference between the voltage of a power source which supplies the electric power and the voltage of the ejection head 50 (hereinafter, this potential difference is referred to as "operational potential difference" in this specification), and a current value which flows into the ejection head 50 is consumed in the ejection head driving circuit 100.

In contrast, in the voltage decrementing portion, the voltage value to be applied to the ejection head 50 is gradually decreased, and a negative electric current flows to the ejection head 50. This means that the electric power is thrown away (discharged) from the ejection head 50. At this time as well, an electric power corresponding to the product of an operational potential difference between the power source and the ejection head 50 and the current value which flows from the ejection head 50 is consumed in the ejection head driving circuit 100. Therefore, when an attempt is made to generate a driving voltage waveform having a large operational potential difference between the power source and the ejection head 50, a large electric power is consumed on the side of the driving circuit. Therefore, it is desired to generate a driving waveform with high efficiency as much as possible.

Since the piezoelectric elements mounted on the ejection head 50 are so-called a capacitive load, the electric power supplied in the voltage incrementing portion is stored on the side of the ejection head 50. Therefore, if it is possible to recover the electric power to be wasted in the ejection head 50 in the voltage decrementing portion to supply to the ejection head 50 to use for increasing the voltage value, a power loss would be reduced significantly. In view of such circumstances, the following configuration is employed in the ejection head driving circuit 100 in the embodiment shown in FIG. 1.

In other words, the ejection head driving circuit 100 in the embodiment shown in FIG. 1 includes a plurality of power source units 10 which generate the electric power to be supplied to the ejection head 50, and the each power source unit 10 is provided with a negative feedback control unit 30. Also, the ejection head driving circuit 100 includes a target voltage waveform output unit 20 configured to output a target voltage waveform to be applied to the ejection head 50. Then, the negative feedback control units 30 provided for the respective power source units 10, upon reception of the target voltage waveform from the target voltage waveform output unit 20, each supplies the electric power generated at the power source unit 10 to the ejection head 50 while performing a negative feedback control so that the voltage value to be applied to the ejection head 50 matches the target voltage waveform. In other words, each pair of the power source unit 10 and the negative feedback control unit 30 corresponding thereto constitutes, so to say, a small driving circuit.

Then, by supplying the target voltage waveform from the target voltage waveform output unit 20 for the respective driving circuits, the driving of the ejection head 50 is enabled. In FIG. 1, each pair of the power source unit 10 and the corresponding negative feedback control unit 30 are surrounded by a rectangle of a fine dashed line to indicate that each constitutes the small driving circuit. Also, the plurality of power source units 10 generate electric powers having voltage values different from each other. In the illustrated example, the four power source units 10 are provided, and the voltage values generated by the respective power source units 10 are E1, E2, E3, and E4 (E1<E2<E3<E4). The number of the power source units 10 is not limited to four, and may be an arbitrary number as long as it is two or larger as a matter of course.

A power source connecting unit 40 selects the one power source unit 10 from among the plurality of power source units 10 (therefore, the drive circuit including the selected power source unit 10) on the basis of the voltage value applied to the ejection head 50 or the voltage value of the target voltage waveform outputted from the target voltage waveform output unit 20. For example, when the voltage value to be applied to the ejection head 50 is low, the driving circuit including the power source unit 10 having a low voltage value is selected. In the example illustrated in FIG. 1, the driving circuit indicated as “a” or the driving circuit indicated as “b” is selected. When the voltage value to be applied is high, the driving circuit including the power source unit 10 having a high voltage value (in the example in FIG. 1, the driving circuit indicated as “c” or “d”) is selected and, when an intermediate voltage value is applied, the driving circuit including the power source unit 10 having an intermediate voltage value (the driving circuit indicated as “b” or “c” in the example in FIG. 1) is selected.

Then, the power source connecting unit 40 connects the selected driving circuit (that is, the power source unit 10 and the negative feedback control unit 30) to the ejection head 50, and other driving circuits are disconnected from the ejection head 50. Then, the negative feedback control unit 30 of the driving circuit connected to the ejection head 50 drives the ejection head 50 using the electric power from the power source unit 10 while performing the negative feedback control according to the target voltage waveform supplied from the target voltage waveform output unit 20. In this configuration, the above-described “operational potential difference” can be maintained to a small value, and hence power consumption when generating the driving voltage waveform as shown in FIG. 2 can be reduced.

In a state in which the voltage value of the target voltage waveform is controlled to be gradually lowered, the electric powers stored in the respective piezoelectric elements of the ejection head 50 are recovered to the power source units 10. The electric powers recovered from the ejection head 50 can be used again when increasing the voltage value of the target voltage waveform again.

In this manner, the ejection head driving circuit 100 in this embodiment includes the plurality of power source units 10 generating different voltage values and the negative feedback control units 30 corresponding to the respective power source units 10. Then, by driving the ejection head 50 while switching the power source units 10 and the negative feedback control units 30 according to the voltage value to be applied to the ejection head 50, the driving voltage waveform is supplied to the ejection head 50 while maintaining the operational potential difference to a small value. Therefore, the power consumption can be reduced. Also, in a state in which a target voltage to be applied to the ejection head 50 is controlled to be lowered, the electric power stored on the side of the ejection head 50 is recovered to the power source units 10 and can be reused for increasing the target voltage again, so that the power consumption as a whole can be dramatically reduced.

As described above, the number of the power source units 10 may be the arbitrary number of at least two. However, the larger the number of the power source units 10 is the smaller the voltage difference between the voltage value generated by the power source unit 10 and the voltage value applied to the ejection head 50 can be made, and hence the reduction of the power consumption is enabled.

In the example illustrated in FIG. 1, the power source connecting unit 40 is provided between the negative feedback control units 30 and the ejection head 50. However, FIG. 1 does not show a detailed configuration of the ejection head driving circuit 100, but only shows functions included in the ejection head driving circuit 100 conceptually. Then, as described above, the function of the power source connecting unit 40 is to connect and disconnect the small driving circuits including the power source units 10 and the negative feedback control units 30 to and from the ejection head 50 according to the voltage value to be applied. Therefore, when such the function can be realized, it is not necessarily required to provide the power source connecting unit 40 between the negative feedback control unit 30 and the ejection head 50 and, for example, it is also possible to provide the power source connecting unit 40 between the power source unit 10 and the negative feedback control unit 30.

The above description is also applicable to the power source units 10 and the negative feedback control units 30. For example, a case in which the respective power source units 10 are connected in series is shown in FIG. 1. However, the respective power source units 10 may be provided separately as long as the electric powers having the different voltage values can be generated. Also, as regards the negative feedback control unit 30, the respective negative feedback control units 30 do not have to be independent completely as shown in FIG. 1, and a configuration in which part of them are commonly used is also applicable.

The ejection head driving circuit 100 in the embodiment as described above will be described in detail below. As described above, with the ejection head driving circuit 100 according to the embodiment, the ejection head 50 can be driven efficiently while reducing the power consumption dramatically by using two effects when classified broadly, that is, an effect to reduce the power consumption by maintaining the operational potential difference to a small value by switching the power source units 10, and an effect to reduce the power consumption by recovering the electric power stored in the ejection head 50. Therefore, for better understanding, a simplified ejection head driving circuit 100 in which only the effect achieved by the operational potential difference reduction will be described first. Then, on the basis of the description, the ejection head driving circuit 100 in which both the effect achieved by the operational potential difference reduction and the effect achieved by the power recovery are utilized will be described.

B. First Embodiment

Embodiment in which an Effect of an Operational Potential Difference Reduction

B-1. Configuration of Ejection Head Driving Circuit

Figure 3:
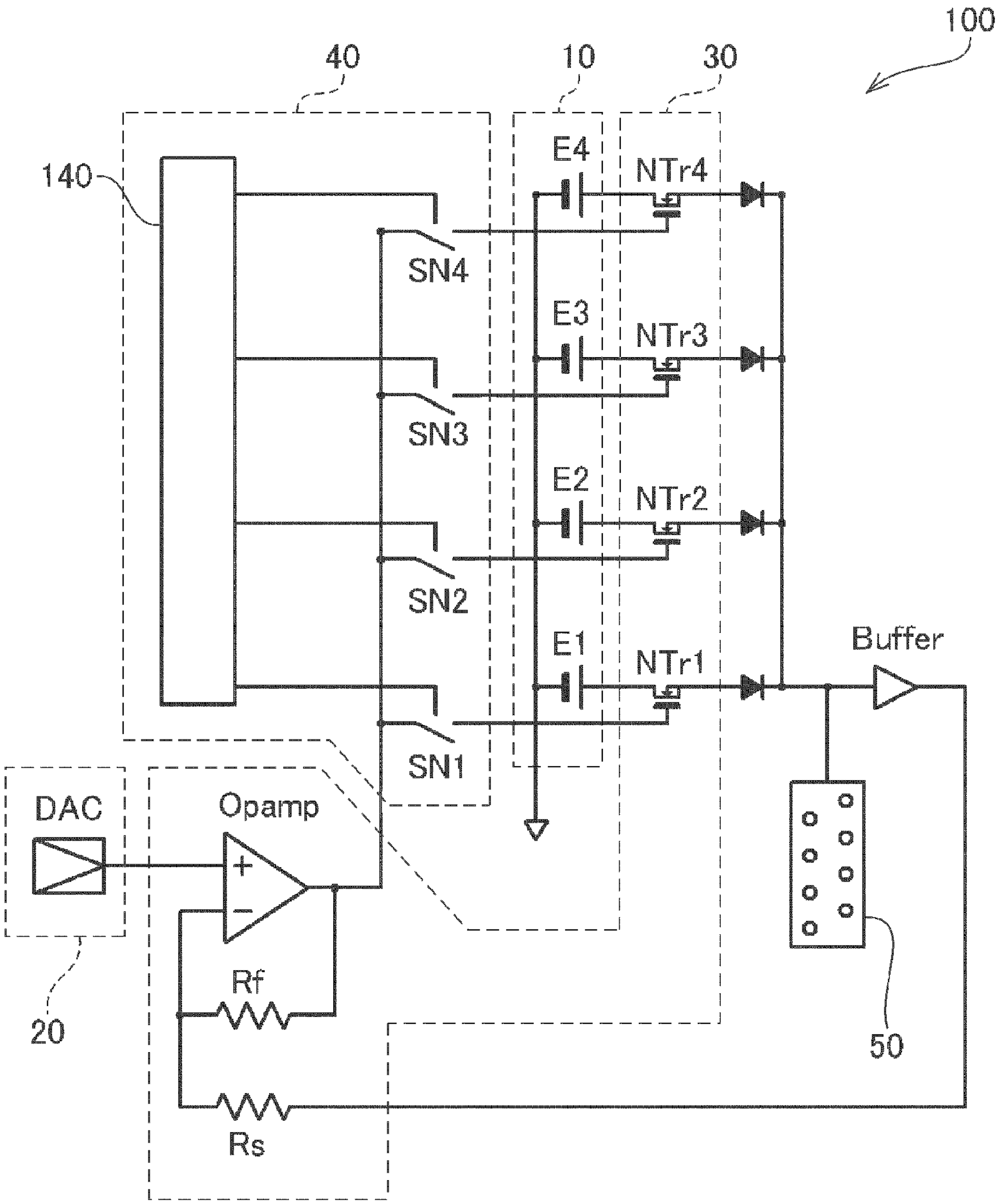
FIG. 3 is an explanatory drawing illustrating a configuration of an ejection head driving circuit according to a first embodiment in which only an effect of reducing an operational potential difference is used.

FIG. 3 is an explanatory drawing illustrating the configuration of the ejection head driving circuit according to a first embodiment. In the illustrated example, four power sources E1 to E4 are provided, and the electric powers generated by the respective power sources E1 to E4 are connected to the ejection head 50 via unipolar-type NMOS transistors Ntr1 to Ntr4. The first embodiment is based on the assumption of the case in which the ejection head 50 is a resistive load, and the ejection head driving circuit 100 in the first embodiment reduces the power consumption using only the effect achieved by the reduction of the operational potential difference and does not use the effect achieved by the power recovery from the ejection head 50. In such a case, any types of the power sources may be used as the power sources E1 to E4 such as primary batteries, secondary batteries, mere capacitors, or so-called power source circuits as long as they can generate the voltage values different from each other. Also, the transistors Ntr1 to Ntr4 are not limited to the unipolar-type transistor, and transistors of other systems such as a bipolar type may also be used.

In FIG. 3, the reason why diodes are inserted between the respective transistors Ntr1 to Ntr4 and the ejection head 50 is because the unipolar-type transistor used in this embodiment has a structure of a high-power driving vertical transistor, which may cause a reverse flow of electric current because a parasitic diodes are formed between drains and sources and hence prevention of such reverse flow is wanted. In the case of FIG. 3, the parasitic diodes are integrated in such a manner that the load side is directed toward an anode and the power source side is directed toward a cathode, although not shown. Therefore, when the voltage of the load is increased to a level higher than the voltages of the power sources (E1-E4), the parasitic diodes of the transistors are biased forward, and hence the electric current flows reversely from the load to the power sources via the parasitic diodes even though the transistors are turned OFF. Therefore, the diodes are inserted in the direction to block this reverse flow. When the transistors which do not cause the reverse flow of the electric current (ex. Bipolar type) are used, the diodes are not necessary.

An output terminal of an operational amplifier Opamp is connected to gate electrodes of the respective transistors Ntr1 to Ntr4. In the respective transistors Ntr1 to Ntr4, the gate electrodes are applied with a pull-down process for avoiding erroneous operation. However, in order to avoid complication of drawing, it is not shown in the drawing. As publicly known, when a NMOS-type transistor is configured in such a manner that a positive voltage is applied between the gate electrodes and source electrodes, a passage referred to as a channel for the charge (electron in this case) is formed. The higher the voltage value to be applied between the gate-source electrodes, the easier the passage of the charge therethrough (equivalent value of resistant becomes smaller) because a large channel is formed. In contrast, the lower the voltage value to be applied between the gate-source electrodes, the more difficult the passage of the charge, so that the equivalent value of resistance is increased.

As the transistors Ntr1 to Ntr4, PMOS-type transistor may be employed instead of the NMOS-type transistor. As shown in FIG. 3, when employing the NMOS-type transistor, it is arranged in such a manner that a drain electrode is connected to the side of the power sources (E1 to E4), while the source electrode is connected to the side of the ejection head 50. In contrast, when employing the PMOS-type transistor, it is arranged in such a manner that the source electrode is connected to the side of the power sources (E1 to E4), while the drain electrode is connected to the side of the ejection head 50. In the case of the PMOS-type transistor, a control is performed by applying a negative voltage between the gate electrode and the source electrode.

Two input terminals are provided on the operational amplifier Opamp. An analogue voltage outputted from a DA converter (hereinafter, referred to as DAC) is connected to one of the input terminals, and a voltage applied to the ejection head 50 is connected to the other input terminal via an input resistance Rs. Then, the output from the operational amplifier Opamp is returned to the input terminal via a feedback resistance Rf, and so-called a negative feedback circuit is formed.

For example, assuming that the voltage value applied to the ejection head 50 is lower than the analogue voltage outputted from the DAC, the output from the operational amplifier Opamp is increased and hence the voltage applied to the gate electrodes is increased, so that the equivalent value of resistance of the transistors is decreased. Consequently, since the amount of voltage drop in the transistors becomes small, the voltage value applied to the ejection head 50 is increased. In contrast, when the voltage value applied to the ejection head 50 is higher than the analogue voltage outputted from the DAC, the output from the operational amplifier Opamp is decreased, and hence the voltage applied to the gate electrodes is decreased, so that the equivalent value of resistance of the transistors is increased. Consequently, since the amount of voltage drop in the transistors becomes large, the voltage value applied to the ejection head 50 is decreased. Therefore, the voltage value applied to the ejection head 50 can be changed according to the analogue voltage outputted from the DAC.

As described above, in the ejection head driving circuit 100 shown in FIG. 3, the respective transistors Ntr1 to Ntr4 and the operational amplifier Opamp are combined to perform a negative feedback control of the voltage value applied to the ejection head 50. Therefore, the negative feedback circuit configured by the respective transistors Ntr1 to Ntr4 and the operational amplifier Opamp corresponds to the negative feedback control unit 30 in FIG. 1. Also, the DAC which outputs the analogue voltage to the operational amplifier Opamp corresponds to the target voltage waveform output unit 20 in FIG. 1. When the ejection head 50 and the input resistance Rs are directly connected, a buffer circuit Buffer inserted between the ejection head 50 and the operational amplifier Opamp is a circuit inserted to prevent the ejection head 50 from being influenced by a direct connection between the ejection head 50 and the input resistance Rs. Therefore, when the effect can be ignored, the buffer circuit Buffer can be omitted, for example, if the resistance of the ejection head 50 is sufficiently smaller than the input resistance Rs.

The output from the operational amplifier Opamp is connected to the gate electrodes of the respective transistors Ntr1 to Ntr4 via switches SN1 to SN4, and the switches SN1 to SN4 are controlled by a gate selector circuit 140. The gate selector circuit 140 has a function to detect the analogue voltage outputted from the DAC or the voltage value applied to the ejection head 50 (the output voltage of the operational amplifier Opamp depending on the cases), connect one of the switches SN1 to SN4, and disconnect other switches. As described above, since the pull-down process is applied to the respective gate electrodes of the transistors Ntr1 to Ntr4, if the switch is disconnected, the voltage is not applied to the gate electrode of the transistor corresponding to the disconnected switch. Consequently, the channel in the transistor is disappeared and the electric current does not flow, so that the power source on the upstream side of the transistor is electrically disconnected from the ejection head 50.

In this manner, in the ejection head driving circuit 100 shown in FIG. 3, when the gate selector circuit 140 connects the switches SN1 to SN4, the power sources E1 to E4 are connected to the ejection head 50 and, in contrast, when the gate selector circuit 140 disconnects the switches SN1 to SN4, the power sources E1 to E4 are disconnected from the ejection head 50. Therefore, the gate selector circuit 140 and the switches SN1 to SN4 correspond to the power source connecting unit 40 in FIG. 1.

B-2. Operation of Ejection Head Driving Circuit

Figure 4A:
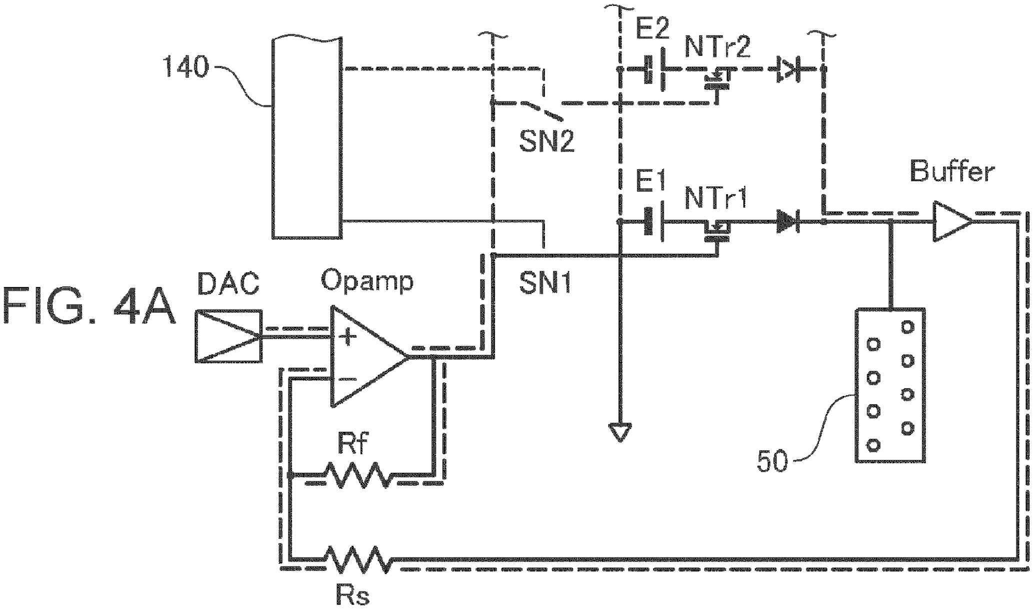
FIGS. 4A to 4C are explanatory drawings showing an operation of the ejection head driving circuit according to the first embodiment which drives a load.
Figure 4B:
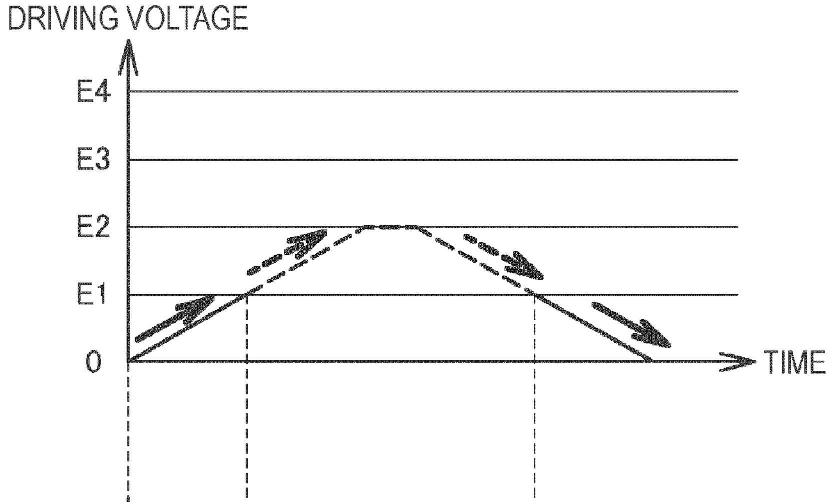
Figure 4C:
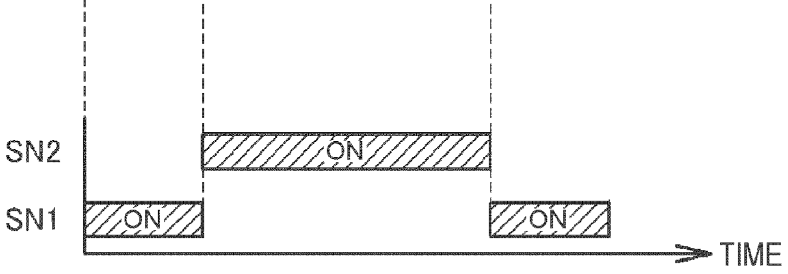

FIGS. 4A to 4C are explanatory drawings showing an operation of the ejection head driving circuit 100 according to the first embodiment which drives the ejection head 50. For the sake of the convenience of description, it is assumed that the power source E1 generates an electric power having a voltage value E1, the power source E2 generates an electric power having a voltage value E2, the power source E3 generates an electric power having a voltage value E3, and the power source E4 generates an electric power having a voltage value E4. The respective voltage values have a relationship as; E1<E2<E3<E4.

Now, a case where the analogue voltage outputted from the DAC increases from 0 (V) will be considered. As described in conjunction with FIG. 3, the analogue voltage outputted from the DAC is a target voltage to be applied to the ejection head 50. When the target voltage to be applied to the ejection head 50 is near 0 (V), the gate selector circuit 140 connects (turns ON) the switch SN1 and disconnects (turns OFF) other switches SN2 to SN4. Consequently, the power source E1 having a smallest voltage value from among the power sources E1 to E4 is connected to the ejection head 50, and the negative feedback circuit is formed by the transistor Ntr1 and the operational amplifier Opamp, whereby the negative feedback control is performed so that the voltage value applied to the ejection head 50 matches the output from the DAC. In FIG. 4A, a state in which the negative feedback circuit is formed by the transistor Ntr1 and the operational amplifier Opamp is shown by a thick solid line. Consequently, the electric power of the power source E1 is applied to the ejection head 50 via the transistor Ntr1 and the diode.

Here, the equivalent value of resistance of the transistor Ntr1 can be decreased by increasing the voltage to be applied to the gate electrode, and the voltage value to be applied to the ejection head 50 can be increased as the equivalent value of resistance is decreased. However, it cannot be increased to a voltage value generated by the power source E1 (that is, E1) or higher as a matter of course. Also, strictly speaking, the equivalent value of resistance of the transistor Ntr1 cannot be decreased to zero and, the diode also has a certain resistance. Therefore, the voltage value applied to the ejection head 50 can be increased only to a voltage value lower than the voltage value generated by the power source E1 by an amount of voltage drop occurring in the transistor Ntr1 or the diode.

In this manner, the voltage value which can be applied to the ejection head 50 by the negative feedback circuit indicated by the thick solid line in FIG. 4A has an upper limit value. Therefore, when the voltage value outputted from the DAC (or the voltage value applied to the ejection head 50) becomes higher than the upper limit value, the gate selector circuit 140 detects it, and disconnects (turns OFF) the switch SN1 and connects the switch SN2 (turns ON). Consequently, the negative feedback circuit formed by the transistor Ntr1 and the operational amplifier Opamp (the circuit indicated by the thick solid line in FIG. 4A) is switched to a new negative feedback circuit formed by the transistor Ntr2 and the operational amplifier Opamp (circuit indicated by a thick broken line in FIG. 4A) and, in association with this, the power source which supplies an electric power to the ejection head 50 is switched from the power source E1 to the power source E2. As described above, since the power source E2 generates the electric power having a voltage value higher than the power source E1, with the configuration to switch the power source as described above, even though the voltage value outputted from the DAC is further increased, the voltage value to be applied to the ejection head 50 can be increased correspondingly.

As a matter of course, the voltage value which can be applied to the ejection head 50 by the power source E2 also has an upper limit value. However, when the voltage value outputted from the DAC (or the voltage value applied to the ejection head 50) reaches its upper limit, then the electric power may be supplied to the ejection head 50 using the power source E3 by turning the switch SN2 OFF and turning the switch SN3 ON.

FIG. 4B shows a state in which the voltage is applied to the ejection head 50 while switching the negative feedback circuits and the power sources according to the voltage value to be applied. FIG. 4C shows a state of turning the switch SN1 and the switch SN2 ON and OFF for switching the negative feedback circuits and the power sources. As shown in FIG. 4B and FIG. 4C, the electric power generated by the power source E1 is supplied to the ejection head 50 using the negative feedback circuit shown by the thick solid line in FIG. 4A by turning the switch SN1 ON and switch SN2 OFF until the voltage (driving voltage) to be applied to the ejection head 50 raises from 0(V) and reaches E1. Strictly speaking, since a certain voltage drop occurs in the transistors Ntr1 to Ntr4 or the diodes, only voltages not exceeding the voltage value E1 generated by the power source E1 can be applied to the ejection head 50. However, in order to avoid complicated description, the voltage drop occurring in the transistors Ntr1 to Ntr4 or the diodes is considered to be ignorable.

When the voltage (driving voltage) to be applied to the ejection head 50 exceeds the voltage value E1, the electric power from the power source E2 is supplied to the ejection head 50 using the negative feedback circuit shown by the thick broken line in FIG. 4A. As shown in FIG. 4C, by switching the switch SN1 from ON to OFF and the switch SN2 from OFF to ON, the electric power from the power source E2 can be supplied to the ejection head 50 using the negative feedback circuit shown by the thick broken line in FIG. 4A. In order to decrease the voltage to be applied to the ejection head 50 from this state, the operation to increase the voltage may be performed in the reverse order.

First of all, the voltage value outputted from the DAC is decreased while keeping the state of the switches SN1 to SN4 as is. Then, the output from the operational amplifier Opamp is decreased, and the voltage applied to the gate electrode of the transistor Ntr2 is lowered, so that the equivalent value of resistance of the transistor is increased. Since the ejection head 50 is assumed to be the resistive load, if the equivalent value of resistance of the transistor is increased, the voltage value to be applied to the ejection head 50 is lowered. Then, when the voltage value to be applied is decreased to the voltage value E1, as shown in FIG. 4C, the negative feedback circuit is switched from the circuit indicated by the thick broken line to the circuit indicated by the thick solid line in FIG. 4A by switching the switch SN2 to OFF and the switch SN1 to ON. After having switched the negative feedback circuit in this manner, the voltage value to be applied to the ejection head 50 can be decreased as the equivalent value of resistance of the transistor Ntr1 included in the new circuit is increased.

In this manner, in the ejection head driving circuit 100 in the first embodiment, the voltage range which can be applied to the ejection head 50 is divided into four voltage ranges of 0 (V) to E1, E1 to E2, E2 to E3, and E3 to E4, and the power sources and the negative feedback circuits are set in advance for the respective voltage ranges. Then, when the driving voltage to be applied to the ejection head 50 is included in any voltage range, the ejection head 50 is driven using the power source and the negative feedback circuit corresponding to the voltage range. However, when the driving voltage of the ejection head 50 straddles over a plurality of voltage ranges, the power source and the negative feedback circuit are switched, and the ejection head 50 is driven using the power source and the negative feedback circuit corresponding to a new voltage range. Consequently, the operational potential difference (the voltage difference between the output voltage of the power source which supplies the electric power and the voltage of the ejection head 50) is reduced and the electric power consumed when driving the ejection head 50 can be reduced. This point will be described as a postscript below.

FIGS. 5A and 5B are explanatory drawings illustrating an ejection head driving circuit which drives the ejection head 50 using a single power source and a single negative feedback circuit for comparison. FIG. 5A shows a detailed circuit configuration and FIG. 5B shows a state in which the driving voltage of the ejection head 50 is raised from 0(V) to the voltage value E4, and then is lowered to 0(V) again. In this manner, if the voltage is applied to the ejection head 50 within the range from 0 (V) to E4, it is necessary to use the power source which generates voltage values of at least E4. When the resistance of the transistor Ntr or the diode is considered, the voltage value generated by the power source should be higher than E4. However, for easy understanding, the resistances of the transistor Ntr and the diode are considered to be ignorable.

The power source E4 constantly generates a electric power having the voltage value E4. Therefore, in the driving circuit shown in FIG. 5A, the voltage value E4 is constantly applied to the upstream side of the transistor Ntr irrespective of the voltage value of the driving voltage to be applied to the ejection head 50. Then, when lowering the voltage value E4 to a driving voltage to be applied to the ejection head 50, the electric power is consumed in the transistor Ntr. The amount of this power consumption increases with increase voltage difference in the operation of the transistor Ntr (that is, the voltage difference between the upstream side and the downstream side of the transistor Ntr (operational potential difference)). Consequently, in the driving circuit shown in FIG. 5A, when the driving voltage to be applied to the ejection head 50 is low, a significantly large amount of electric power is consumed.

In contrast, in the ejection head driving circuit 100 in the first embodiment shown in FIG. 3, the four power sources E1 to E4 generating voltages of different values and the negative feedback circuits corresponding to the respective power sources are provided. As described above using FIG. 4A to FIG. 4C, the ejection head 50 is driven while switching the power sources E1 to E4 and the negative feedback circuits depending on which voltage range the driving voltage to be applied to the ejection head 50 exists in among the ranges 0 (V) to E1, E1 to E2, E2 to E3, and E3 to E4.

FIGS. 6A and 6B show a state of driving the ejection head 50 while switching the power sources E1 to E4 in the ejection head driving circuit 100 in the first embodiment. Therefore, when the driving voltage to be applied to the ejection head 50 is within the voltage range of 0 (V) to E1 for example, the electric power is supplied from the power source E1, so that only the voltage value E1 is applied to the transistor Ntr1. Also, even when the driving voltage to be applied to the ejection head 50 rises to the voltage range of E1 to E2, only the voltage value E2 is applied to the transistor Ntr2 because the power source which supplies the electric power is switched to the power source E2.

Even when the driving voltage of the ejection head 50 further rises, the potential difference in operation of the transistors Ntr1 to Ntr4 (operational potential difference) can be reduced to voltage differences of ranges like 0 (V) to E1, E1 to E2, E2 to E3, and E3 to E4 at the most at last by switching the power source to supply the electric power to the ejection head 50 to the power sources E3, E4. Consequently, as shown in FIG. 5A, the power consumption can be reduced significantly in comparison with the ejection head driving circuit in the related art which drives the ejection head 50 using the single power source and the single negative feedback circuit.

In the description given above, the driving voltage to be applied to the ejection head 50 has been described to take voltage values from 0 (V) to positive values. However, by using a power source which generates negative voltage values, application of the driving voltage taking the negative values is enabled. When the power source which generates the negative voltage values and the power source which generates the positive voltage values are used, the driving voltage whose voltage values change between positive values and the negative values can be applied to the ejection head 50.

Figure 7:
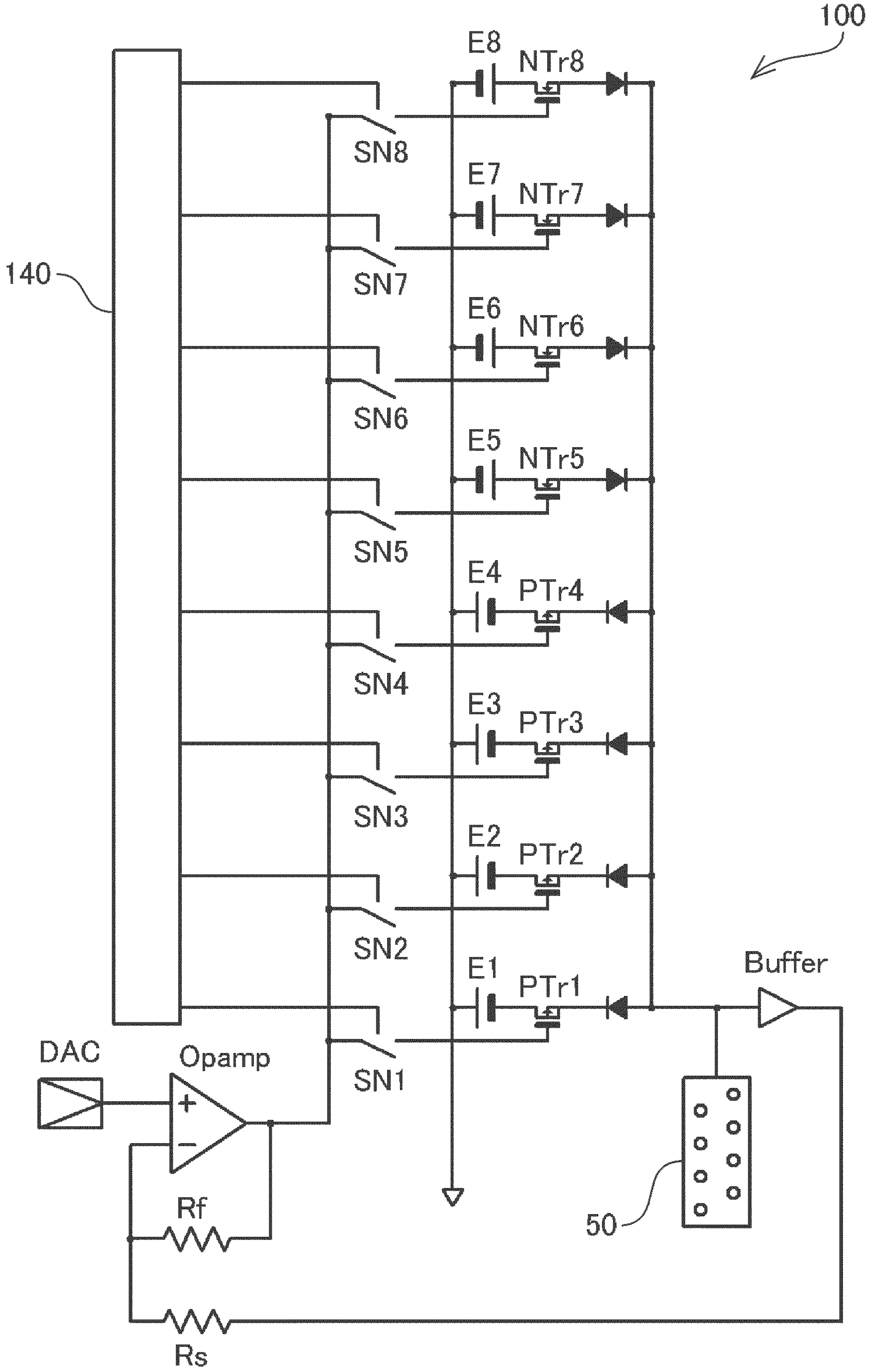
FIG. 7 is an explanatory drawing illustrating the ejection head driving circuit which is able to apply a driving voltage whose voltage values change between positive values and negative values to the load.

FIG. 7 is an explanatory drawing illustrating the ejection head driving circuit 100 which is able to apply the driving voltage whose voltage values change between the positive values and the negative values to the ejection head 50. In the illustrated example, four power sources of power sources E5 to E8 generate electric powers having the positive voltage values as in the case of the ejection head driving circuit 100 shown in FIG. 3 and, in contrast, the four power sources of the power sources E1 to E4 generate electric powers having the negative voltage values. Correspondingly, as regards the four power sources of the power sources E5 to E8, the drain electrodes of respective NMOS-type transistors (Ntr5 to Ntr8) are connected to the power sources (E5 to E8) and the source electrodes of the respective transistors (Ntr5 to Ntr8) are connected to the side of the ejection head 50 as in FIG. 3.

In contrast, as regards the four power sources of the power sources E1 to E4, the drain electrodes of respective PMOS-type transistors (Ptr1 to Ptr4) are connected to the power sources (E1 to E4) and the source electrodes of the respective transistors (Ptr1 to Ptr4) are connected to the side of the ejection head 50. Also, as regards the PMOS-type transistors (Ptr1 to Ptr4), diodes for preventing the reverse flow are inserted between the transistors and the ejection head 50 in the opposite direction from the NMOS-type transistors (Ntr5 to Ntr8) (so that the direction from the drain electrodes of the transistors Ptr1 to Ptr4 toward the ejection head 50 correspond to the forward direction).

Then, assuming that the relationship of the magnitudes of the voltage values E1 to E8 generated by these power sources is E1<E2<E3<E4<0<E5<E6<E7<E8, if the driving voltage to be applied to the ejection head 50 is a positive voltage value, the driving voltages of 0 (V) to E8 (positive voltage values) can be applied to the ejection head 50 by switching the switch to be turned ON from the switch SN5 to the switch SN8 as the increase of the voltage value. Also, if the driving voltage to be applied is a negative voltage value, the driving voltages of E1 (negative voltage values) to 0 (V) can be applied to the ejection head 50 by switching the switch to be turned ON from the switch SN4 to the switch SN1 as the decrease of the voltage value (as the increase of the absolute value).

In the first embodiment described above, the ejection head 50 is assumed to be the resistive load, and hence the ejection head driving circuit 100 in which only the effect to reduce the power consumption is used by reducing the operational potential difference by switching the plurality of power source units 10 has been described. However, as described above, the piezoelectric elements mounted on the ejection head 50 are generally capacitive loads, and the supplied electric power is stored in the ejection head 50. The term "capacitive load" means a load having a feature to store at least part of the supplied electric power. Therefore, if the electric power can be recovered from the ejection head 50 and can be used again, the power consumption can further be reduced. In the actual ejection head driving circuit 100, the power consumption can significantly be reduced using the two effects; the effect achieved by the operational potential difference reduction described as the first embodiment, and the effect achieved by the power recovery. An ejection head driving circuit 100 in a second embodiment configured as described above will be described below.

C. Second Embodiment

Embodiment in which an Effect of an Operational Potential Difference Reduction and an Electric Power Recovery

C-1: Configuration of Ejection Head Driving Circuit

Figure 8:
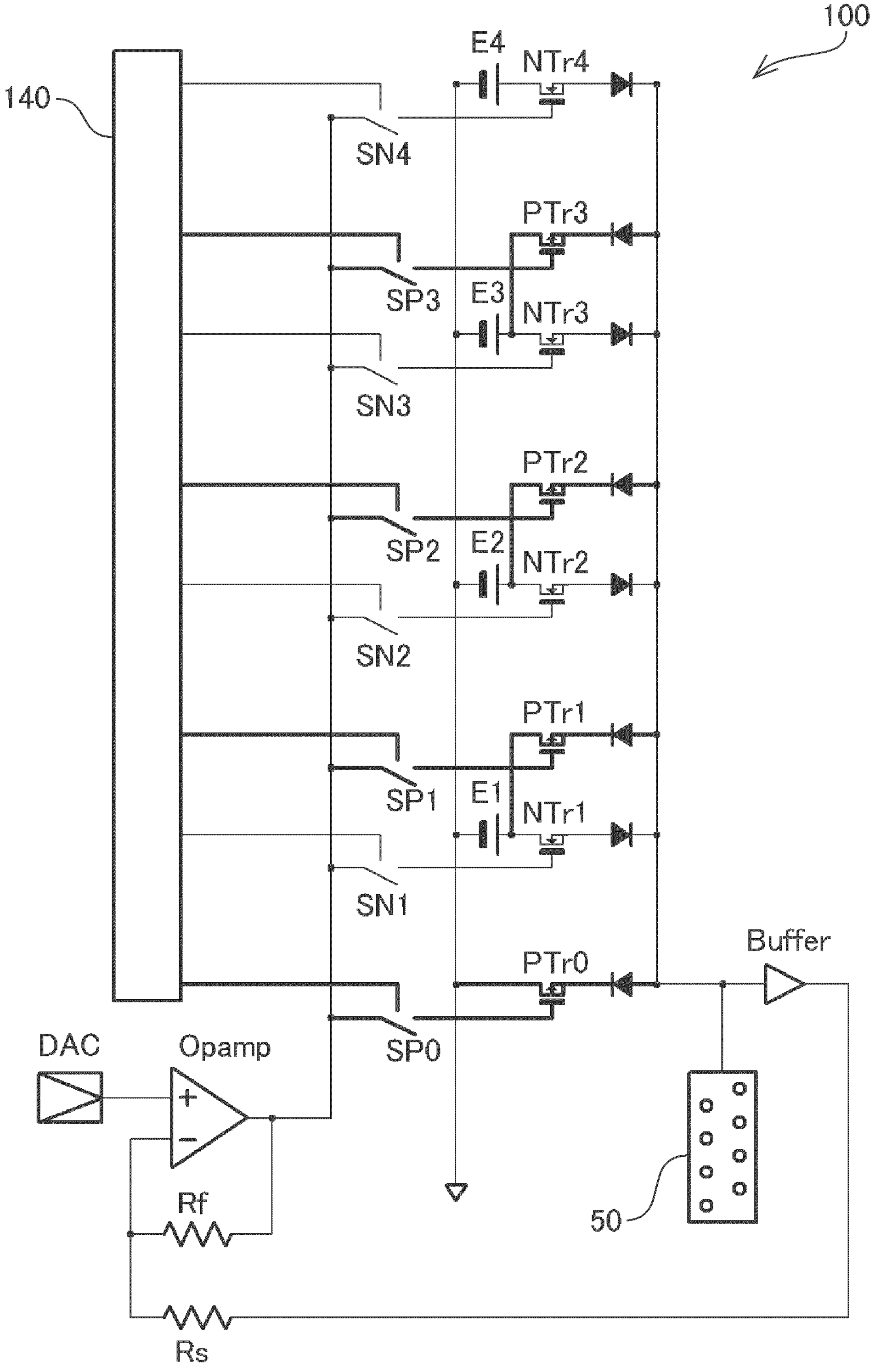
FIG. 8 is an explanatory drawing illustrating a configuration of the ejection head driving circuit according to a second embodiment which performs a power recovery in addition to the reduction of the operational potential difference.

FIG. 8 is an explanatory drawing illustrating the configuration of the ejection head driving circuit 100 according to the second embodiment. In the ejection head driving circuit 100 according to the second embodiment, the four power sources E1 to E4 are provided in the same manner as the ejection head driving circuit 100 according to the first embodiment shown in FIG. 3, and generate the electric powers having the voltage values E1, E2, E3, and E4, respectively. Also, the electric powers from the respective power sources E1 to E4 are connected to the ejection head 50 via the unipolar type NMOS transistors Ntr1 to Ntr4. In the second embodiment, since the electric power stored in the ejection head 50 needs to be recovered and reused, power sources which can store at least part of the electric power supplied from the outside, such as the secondary batteries or capacitors, are used as the power sources E1 to E4.

Also, as shown in FIG. 8, the ejection head driving circuit 100 according to the second embodiment is provided with unipolar type PMOS transistors Ptr0 to Ptr3 in a direction to feedback the electric power from the ejection head 50 to the ground or the respective power sources; the power sources E1 to E3 in contrast to the ejection head driving circuit 100 according to the first embodiment shown in FIG. 3. Also, the transistors Ptr0 to Ptr3 are not limited to the unipolar type transistor, and transistors of other systems such as a bipolar type may also be used. Although the diodes for preventing the reverse flow are inserted between the transistors Ptr0 to Ptr3 and the ejection head 50 as well, when the transistor having the structure which does not cause the reverse flow (ex. bipolar type) is used, these diodes are not necessary.

The output terminal of the operational amplifier Opamp is connected to the respective gate electrodes of the respective transistors Ntr1 to Ntr4 on the side where the electric powers of the power sources E1 to E4 are supplied to the ejection head 50 via the switches SN1 to SN4. This configuration is the same as that of the ejection head driving circuit 100 according to the first embodiment shown in FIG. 3. However, as described above, in the ejection head driving circuit 100 according to the second embodiment, the transistors Ptr0 to Ptr3 configured to feedback the electric power of the ejection head 50 are also provided, the output terminal of the operational amplifier Opamp is also connected to the gate electrodes of the transistors Ptr0 to Ptr3, and switches SP0 to SP3 are provided between the respective gate electrodes and the output terminal of the operational amplifier Opamp. In the respective transistors Ptr0 to Ptr3, the gate electrodes are applied with the pull-up process for avoiding erroneous operation. However, in order to avoid complication of drawing, it is not shown in the drawing.

The gate selector circuit 140 switches the states of the switches SN1 to SN4 and the switches SP0 to SP3 ON or OFF. Then, depending on which one of the switches SN1 to SN4 or the switches SP0 to SP3 are turned on, the negative feedback circuit is formed by the corresponding transistors Ntr1 to Ntr4 or the transistors Ptr0 to Ptr3, and the operational amplifier Opamp. Consequently, the voltage value applied to the ejection head 50 can be negative feedback controlled by causing the same to follow the analogue voltage outputted from the DAC. This point will be described in detail below.

C-2. Operation of Ejection Head Driving Circuit

Figure 9A:
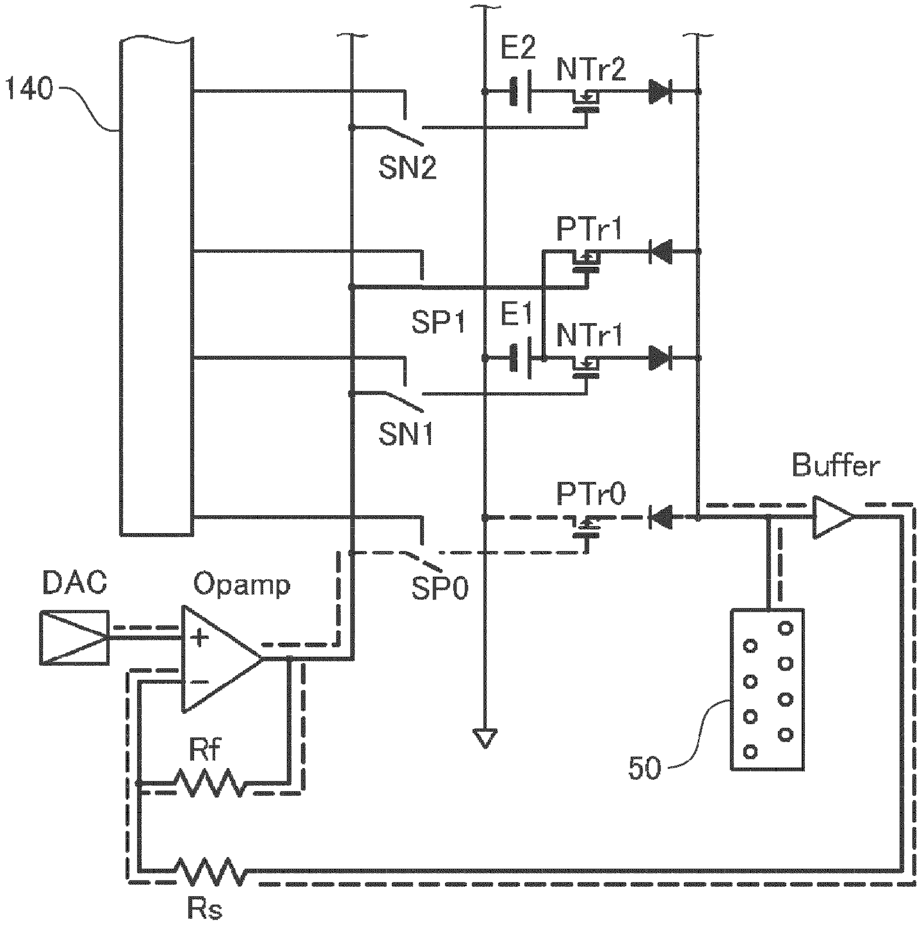
FIGS. 9A and 9B are explanatory drawings showing an operation of the ejection head driving circuit according to the second embodiment which drives a capacitive load.
Figure 9B:
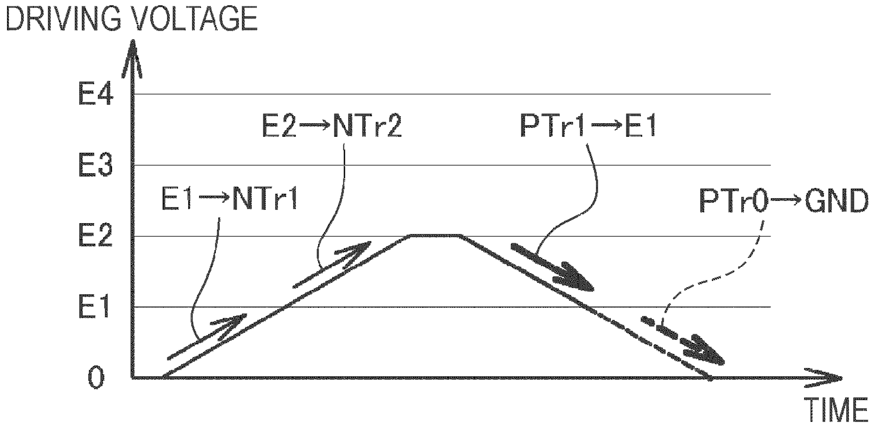

FIGS. 9A and 9B are explanatory drawings showing an operation of the ejection head driving circuit 100 according to the second embodiment which drives the ejection head 50. In the second embodiment as well, the power sources E1, E2, E3, E4 generate the electric powers having the voltage values of E1, E2, E3, E4, and the respective voltage values have a relationship; 0 (V)<E1<E2<E3<E4. In order to avoid complicated description, the internal resistances of the respective transistors Ntr1 to Ntr4, Ptr0 to Ptr3 or the diodes are assumed to be ignorable in the second embodiment as well.

In a case where the driving voltages to be applied to the ejection head 50 (the analogue voltage outputted from the DAC) is increased, the ejection head driving circuit 100 in the second embodiment operates in the completely same manner as the first embodiment described above in conjunction with FIG. 4A to FIG. 4C. In other words, when the driving voltage is in the voltage range from 0 (V) to E1, the gate selector circuit 140 turns the switch SN1 ON and turns all other switches (switches SN2 to SN4, and switches SP0 to SP3) OFF. Consequently, a negative feedback circuit by the transistor Ntr1 and the operational amplifier Opamp is formed and the electric power of the power source E1 is applied to the ejection head 50 according to the analogue voltage outputted from the DAC. Also, when the driving voltage to be applied to the ejection head 50 exceeds the maximum possible voltage value to be supplied from the power source E1, the switch SN1 is turned OFF and the switch SN2 is turned ON. Consequently, the negative feedback circuit formed by the transistor Ntr1 and the operational amplifier Opamp is switched to the negative feedback circuit by the transistor Ntr2 and the operational amplifier Opamp, and then the electric power of the power source E2 is supplied to the ejection head 50.

FIG. 9B shows a state in which the electric power is supplied from the power source E1 to the ejection head 50 via the transistor Ntr1 while the driving voltage rises from 0 (V) to E1, and the electric power is supplied from the power source E2 to the ejection head 50 via the transistor Ntr2 while the driving voltage rises from E1 to E2. In this manner, while the driving voltage to be applied to the ejection head 50 rises, the power sources which supply the electric power to the ejection head 50 may be switched in sequence by switching the switches SN1 to SN4.

In contrast, when the driving voltage to be applied to the ejection head 50 (the analogue voltage outputted from the DAC) is decreased, all the switches SN1 to SN4 are turned OFF and one of the switches SP0 to SP3 is turned ON according to the driving voltage. For example, a case where the driving voltage is decreased from E2 to E1 will be considered. When the driving voltage is within the range from E1 to E2, and reduction is wanted, the switch SP1 is turned ON. Then, the output of the operational amplifier Opamp is inputted to the gate electrode of the transistor Ptr1, and a channel of a positive hole is formed in the transistor Ptr1, so that the ejection head 50 and the power source E1 are electrically connected. Since the voltage value E2 is applied to the ejection head 50, the electric power stored in the ejection head 50 is fed back to the power source E1. Then, when the power source E1 is a power source which is able to store the electric power supplied from the outside, for example, such as the secondary battery, the stored electric power can be used for driving the ejection head 50, so that the power consumption is significantly reduced.

The transistor Ptr1 has a feature such that if the voltage to be applied to the gate electrode is lowered, the equivalent value of resistance of the transistor Ptr1 becomes smaller correspondingly. Therefore, by inputting the analogue voltage outputted from the DAC (a target voltage to be applied to the ejection head 50) and the driving voltage actually applied to the ejection head 50 to the operational amplifier Opamp and applying the output from the operational amplifier Opamp to the gate electrode, the negative feedback circuit is formed and the driving voltage applied to the ejection head 50 can be controlled. For example, when the driving voltage applied to the ejection head 50 is higher than the target voltage outputted from the DAC, the output from the operational amplifier Opamp is decreased, and hence the equivalent value of resistance of the transistor Ptr1 is also decreased. Consequently, the driving voltage applied to the ejection head 50 is decreased and gets close to the target voltage outputted from the DAC.

In FIG. 9A, the negative feedback circuit formed by the transistor Ptr1 and the operational amplifier Opamp when the switch SP1 is turned ON is indicated by the thick solid line. In this manner, when the driving voltage of the ejection head 50 is decreased from the voltage value E2 to the voltage value E1 while performing the negative feedback control, the electric power stored in the ejection head 50 is fed back to the power source E1 via the transistor Ptr1 and, as a consequence, the driving voltage is gradually decreased. FIG. 9B shows a state in which the electric power of the ejection head 50 is fed back to the power source E1 via the transistor Ptr1 by a thick solid arrow.

When the driving voltage of the ejection head 50 is decreased to a level lower than the voltage value E1, the switch SP1 is turned OFF and the switch SP0 is turned ON using the gate selector circuit 140. Consequently, the negative feedback circuit formed by the transistor Ptr1 and the operational amplifier Opamp (the circuit indicated by the thick solid line in FIG. 9A) is switched to a new negative feedback circuit formed by the transistor Ptr0 and the operational amplifier Opamp. In FIG. 9A, the newly switched negative feedback circuit is shown by the thick broken line. Consequently, the electric power stored in the ejection head 50 is discharged to a ground via the transistor Ptr0 and, in association with this, the driving voltage applied to the ejection head 50 is lowered. FIG. 9B shows a state in which the electric power of the ejection head 50 is discharged to the ground via the transistor Ptr0 by a thick broken arrow. Also, when raising the driving voltage again from the decreased state, the switch corresponding to the current voltage value from among the switches SN1 to SN4 may be turned ON as described above.

In this manner, in the ejection head driving circuit 100 in the second embodiment as well, the voltage range which can be applied to the ejection head 50 is divided into four voltage ranges of 0 (V) to E1, E1 to E2, E2 to E3, and E3 to E4, and the power sources E1 to E4 which are assigned to their own voltage ranges respectively are set in advance. Then, when raising the driving voltage to be applied to the ejection head 50, the power source which is assigned to the corresponding voltage range is connected to the ejection head 50, and the driving voltage is applied to the ejection head 50 while performing the negative feedback control. For example, when the driving voltage is in between the voltage value E1 and the voltage value E2, the power source E2 which is assigned to the voltage range of E1 to E2 is used to drive the ejection head 50. In contrast, when reducing the driving voltage to be applied to the ejection head 50, the power source which is assigned to the voltage range which is one level lower than the current voltage is connected to the ejection head 50.

Then, the negative feedback control is performed while feeding back the electric power stored in the ejection head 50 to the power source, so that the driving voltage to be applied to the ejection head 50 is decreased. For example, when the driving voltage is in between the voltage value E1 and the voltage value E2, the power source E1 which is assigned to the voltage range of 0 (V) to E1 is connected to the ejection head 50, and the electric power of the ejection head 50 is stored in the power source E1. Accordingly, the power consumption when driving the ejection head 50 can be reduced. In particular, when the power sources E1 to E4 are the power sources which are able to store at least part of the electric power supplied from the outside as the secondary battery or the capacitor, the power consumption can further be reduced. The reason will be described below.

Figure 10A:
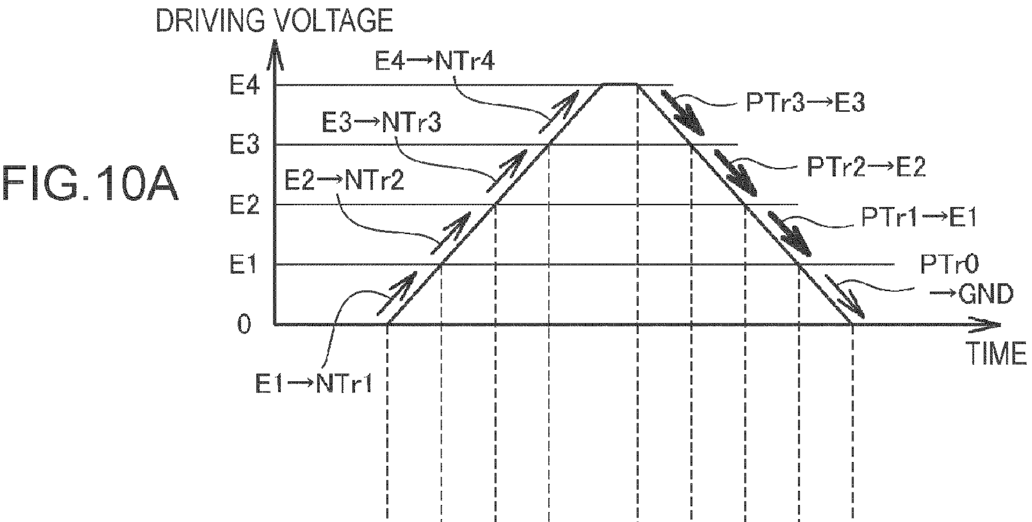
FIGS. 10A and 10B are explanatory drawings showing reasons why the power consumption is reduced by performing the power recovery in addition to the reduction of the operational potential difference in the ejection head driving circuit according to the second embodiment.
Figure 10B:
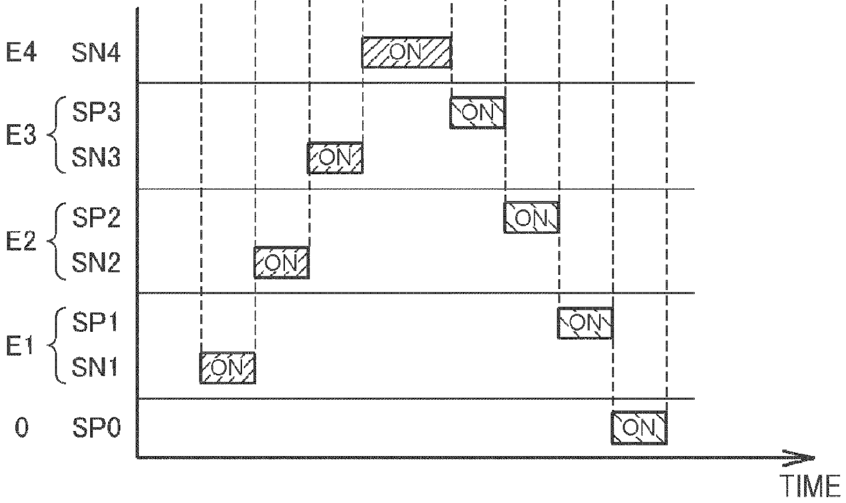

FIG. 10A and FIG. 10B are explanatory drawings showing a state in which the driving voltage to be applied to the ejection head 50 is raised from 0(V) to E4 and then is decreased from E4 to 0(V) in the ejection head driving circuit 100 according to the second embodiment. FIG. 10A shows a state in which the electric power is supplied from the power source unit 10 to the ejection head 50 or the electric power is recovered from the ejection head 50 to the power source unit 10 in association with the increase and decrease of the driving voltage. FIG. 10B shows a state in which the switches SN1 to SN4, and the switches SP0 to SP3 are switched to ON or OFF in association with the increase or decrease of the driving voltage.

As shown in FIG. 10B, when raising the driving voltage from 0(V) to E1, the driving voltage is raised while supplying the electric power of the power source E1 to the ejection head 50 via the transistor Ntr1 by turning the switch SN1 ON. When the driving voltage reaches the voltage value E1, the switch SN1 is turned OFF and the switch SN2 is turned ON, so that the driving voltage is raised while supplying the electric power of the power source E2 to the ejection head 50 via the transistor Ntr2. When the driving voltage reaches the voltage value E2, the switch SN2 is turned OFF and the switch SN3 is turned ON, so that the electric power of the power source E3 is supplied to the ejection head 50 via the transistor Ntr3.

Furthermore, when the driving voltage reaches the voltage value E3, the switch SN3 is turned OFF and the switch SN4 is turned ON, so that the electric power of the power source E4 is supplied to the ejection head 50 via the transistor Ntr4. FIG. 10A and FIG. 10B show a state in which the driving voltage to be applied to the ejection head 50 is gradually raised while switching the power sources E1 to E4 in this manner. As shown in FIG. 10A, during this period, the electric powers are supplied from the power sources E1, E2, E3, E4 to the ejection head 50 via the transistors Ntr1 to Ntr4. At this time, the voltage differences in operation of the respective transistors Ntr1 to Ntr4 are only the voltage differences generated by the respective power sources E1 to E4, that is, the voltage differences of about 0 (V) to E1, E1 to E2, E2 to E3, and E3 to E4 at the most. Therefore, in the same manner as the ejection head driving circuit 100 according to the first embodiment, the power consumption is reduced by the effect of reducing the operational potential difference.

Subsequently, when reducing the driving voltage from the voltage value E4, the switch SN4 is firstly turned OFF, and then the switch SP3 is turned ON. Then, as described above, the electric power stored in the ejection head 50 is fed back to the power source E3 via the transistor Ptr3 and, in association with this, the driving voltage applied to the ejection head 50 is decreased. If the power source E3 is a power source which is able to store the supplied electric power in this case, the electric power fed back from the ejection head 50 is recovered and stored in the power source E3.

When the driving voltage of the ejection head 50 is decreased to the voltage value E3, the switch SP3 is turned OFF and the switch SP2 is turned ON, so that the electric power of the ejection head 50 is fed back to the power source E2 via the transistor Ptr2. Consequently, the electric power recovered from the ejection head 50 is now stored in the power source E2. Furthermore, when the driving voltage is decreased to the voltage value E2, the switch SP2 is turned OFF and the switch SP1 is turned ON to feed back the electric power of the ejection head 50 to the power source E1 via the transistor Ptr1. If the power source E2 or the power source E1 is able to store the electric power, the electric power fed back from the ejection head 50 is stored in the power source E2 or the power source E1. When the driving voltage is decreased to the voltage value E1, finally, the switch SP1 is turned OFF and the switch SP0 is turned ON. Then, the electric power of the ejection head 50 is discharged to the ground via the transistor Ptr0 and, in association with it, the driving voltage applied to the ejection head 50 is decreased to 0(V).

FIG. 10A and FIG. 10B show a state in which the driving voltage applied to the ejection head 50 is gradually decreased while feeding back the driving voltage applied to the ejection head 50 to the power sources which generate electric powers having lower voltage values. In the ejection head driving circuit 100 according to the second embodiment, the power sources which are able to store the electric power supplied from the outside such as the secondary battery are used as the power sources E1 to E3 to which the electric powers are fed back from the ejection head 50. The arrows indicated by thick solid lines in FIG. 10A and FIG. 10B show a state in which the driving voltage is decreased while storing the electric powers fed back from the ejection head 50 in the power sources E1 to E3.

In this manner by recovering the electric power from the ejection head 50 and storing the same in the power source when reducing the driving voltage, the stored electric power can be used for raising the driving voltage for the next time. For example, when the driving voltage is raised from 0 (V) to E1 again, the electric power is supplied from the power source E1. At this time, by supplying the electric power recovered from the ejection head 50 and stored therein, a new electric power does not practically have to be supplied and the driving voltage of the ejection head 50 can be raised.

In the same manner, since the electric power from the ejection head 50 is recovered and stored in the power source E2 and the power source E3 as well, when raising the driving voltage from E1 to E2, and further from E2 to E3, a new electric power does not practically have to be supplied by supplying only the electric powers stored in the power source E2 and the power source E3 to the ejection head 50, so that the driving voltage to be applied to the ejection head 50 can be raised. After all, by storing the electric power recovered from the ejection head 50 in the power sources, the driving voltage in the range from 0 (V) to E3 can be applied without supplying the new electric power and, consequently, the power consumption can be reduced significantly.

In the description given above, the four power sources; the power sources E1 to E4 are provided in the ejection head driving circuit 100. However, by providing a larger number of power sources and dividing the voltage range to be applied to the ejection head 50 more finely, the range of the driving voltage which can be applied to the ejection head 50 without supplying the new electric power can be enlarged. Consequently, the power consumption can be reduced further significantly. In the ejection head driving circuit 100 according to the second embodiment as well, application of the negative driving voltage or application of the driving voltage which changes between the positive values and the negative values can be achieved to the ejection head 50 as in the first embodiment.

D. Modified Embodiment

In addition to the embodiments described above, there are other conceivable modified embodiments. These modified embodiments will be described below.

D-1. First Modified Embodiment

In the second embodiment described above, the power sources E1 to E4 which generate voltages higher than the voltage value applied to the ejection head 50 are connected to the ejection head 50 while the driving voltage is increasing, and the power sources E1 to E4 which generate voltages lower than the voltage value applied to the ejection head 50 are connected to the ejection head 50 while the driving voltage is reducing. Therefore, as shown in FIG. 10B, only one of the respective switches of SN1 to SN4 and SP0 to Sp3 are turned ON. In contrast, it is also possible to drive the ejection head 50 while connecting a power source unit which generates a higher voltage value and a power source unit which generates a lower voltage value than that applied to the ejection head 50 simultaneously.

Figure 11A:
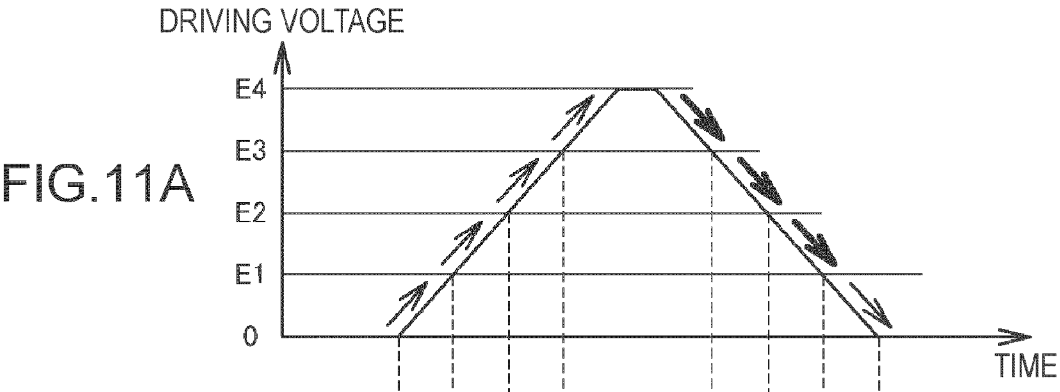
FIGS. 11A to 11C are explanatory drawings showing a state of driving an ejection head using an ejection head driving circuit according to a first modified embodiment.
Figure 11B:
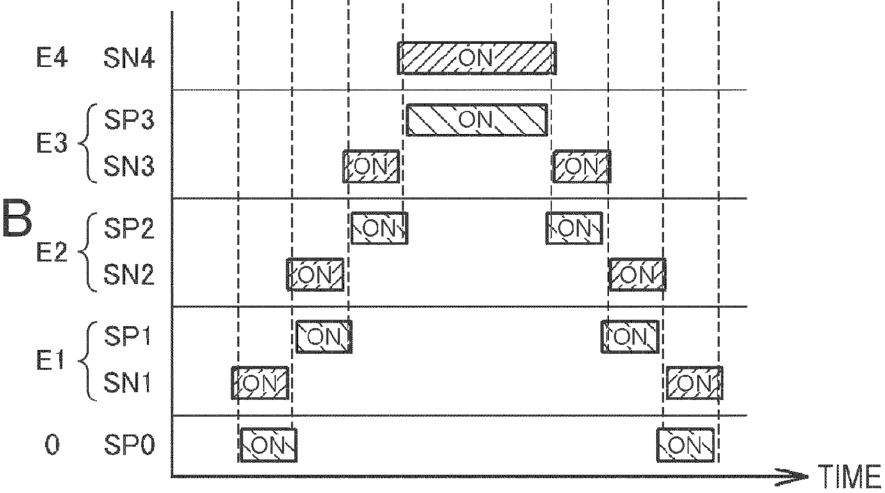
Figure 11C:
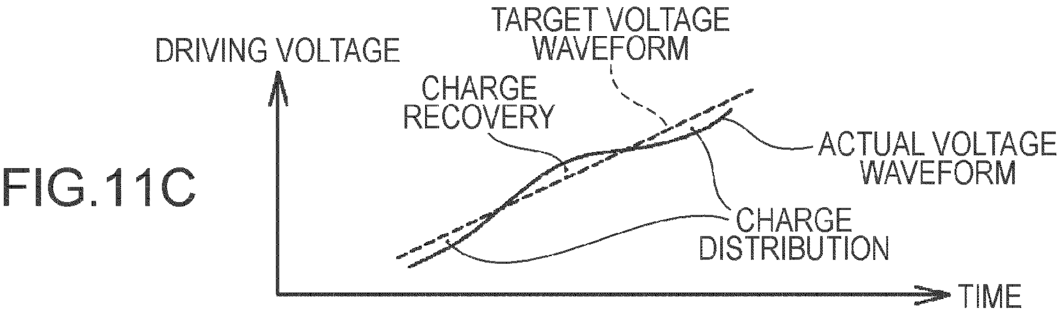

FIGS. 11A to FIG. 11C are explanatory drawings showing a state of driving the ejection head 50 in the ejection head driving circuit 100 according to a first modified embodiment as described above. FIG. 11A shows a state in which the driving voltage is applied to the ejection head 50 while switching the negative feedback circuits of the power sources E1 to E4. In FIG. 11B, the setting state of the respective switches; SN1 to SN4, and SP0 to SP3 at this time is shown. As shown in FIG. 11B, in the ejection head driving circuit 100 according to the first modified embodiment, the negative feedback circuit of the power source unit which generates a voltage higher than the voltage value to be applied to the ejection head 50 and the negative feedback circuit of the power source unit which generates a voltage lower than that are always in ON state.

As shown in FIG. 11C, the voltage value applied to the ejection head 50 does not necessarily match the voltage value of the target voltage waveform always completely, and is normally controlled while becoming higher or lower than the target voltage waveform. Here, in the ejection head driving circuit 100 according to the first modified embodiment, when the applied voltage exceeds the target voltage in the course of increasing the target voltage to be applied to the ejection head 50, the electric power is recovered by the power source unit which generates a low voltage value, so that the applied voltage can be brought closer to the target voltage quickly.

In contrast, when the applied voltage underruns the target voltage in the course of decreasing the target voltage to be applied to the ejection head 50, the electric power is supplied from the power source unit which generates a high voltage value, so that the applied voltage can be brought closer to the target voltage quickly. In this manner, in the ejection head driving circuit 100 according to the first modified embodiment, even when an overshooting of the applied voltage occurs while increasing the target voltage or, in contrast, even when an undershooting of the applied voltage occurs while decreasing the target voltage, the applied voltage can be brought closer to the target voltage quickly, so that an accurate driving voltage waveform can be supplied to the ejection head 50.

The timings of switching the respective switches of SN1 to SN4, SP0 to SP3 are timings when the driving voltage reaches the voltage values generated by the respective power source units E1 to E4. In fact, however, the voltage drop occurs by an amount of internal resistances of these switches and the transistors. Therefore, as regards the switches SN1 to SN4 on the side which supplies the electric power from the power source unit to the ejection head 50, switching at a timing a little before the driving voltage reaches the voltage value generated by the power source unit is preferable. In contrast, as regards the switches SP0 to SP3 on the side which recovers the electric power from the ejection head 50 to the power source unit, switching at a timing a little after the driving voltage reaches the voltage value generated by the power source unit is preferable. In FIG. 11B, considering the things as described above, the timing of switching the switches SN1 to SN4 and the timing of switching the switches SP0 to SP3 are shifted a little.

D-2. Second Modified Embodiment

In the embodiments described above, the description is given on the basis of an assumption that all of the power sources E1 to E4 generate the electric powers having the always stable voltage values. However, there exist power sources whose voltage value is lowered as it supplies the electric power like the capacitor and power sources which do not necessarily generate the electric power having the stable voltage value like the secondary battery. In addition, there may be a case where the supply of the electric power having a stable voltage value is difficult because the electric power supplied to the ejection head 50 is excessive with respect to the capacity of the power source. In such a case, it is also possible to observe the voltage values which the respective power sources generate, and switch the switches SN1 to SN4 or the switches SP0 to SP3 so that the power source which generates an optimum voltage value is connected to the ejection head 50 according to the driving voltage to be applied to the ejection head 50.

Figure 12:
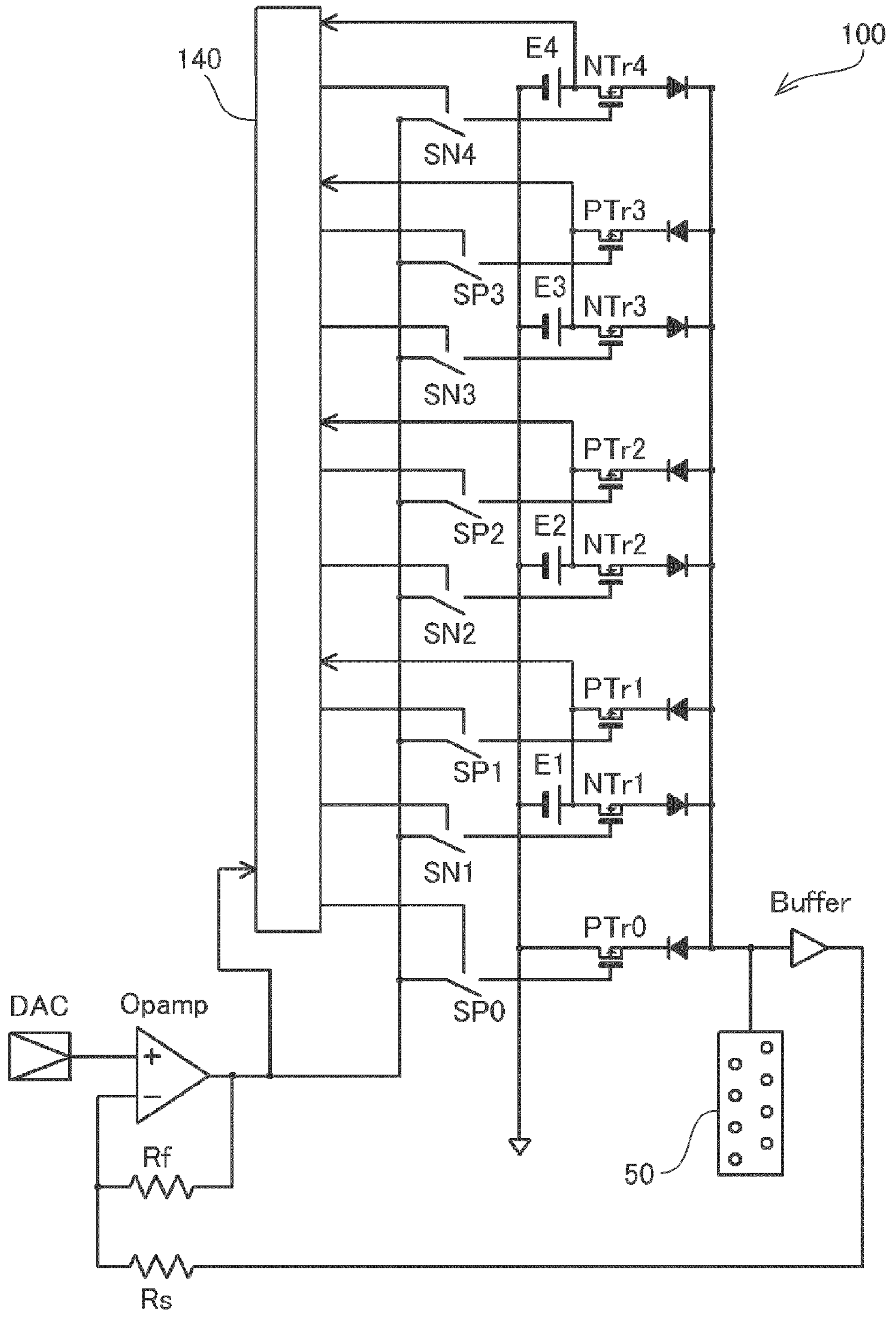
FIG. 12 is an explanatory drawing illustrating an example of the ejection head driving circuit according to a second modified embodiment.

FIG. 12 is an explanatory drawing illustrating an example of the ejection head driving circuit 100 according to a second modified embodiment as described above. In the ejection head driving circuit 100 shown in FIG. 12, the voltage values generated by the power sources E1 to E4, and the driving voltage to be applied to the ejection head 50 (the output voltage from the DAC) are inputted to the gate selector circuit 140. Then, the gate selector circuit 140 switches the switches SN1 to SN4 or the switches SP0 to SP3 according to the determination whether the driving voltage is rising or decreasing, and to the driving voltage values and the voltage values generated by the respective power sources.

For example, if the driving voltage is rising, the corresponding switch from the switches SN1 to SN4 is turned ON so that the electric power is supplied to the ejection head 50 from the power source having the lowest voltage value from among the power sources which generate voltage values higher than the driving voltage by a certain extent. In contrast, if the driving voltage is decreasing, the corresponding switch from the switches SP0 to SP3 is turned ON so that the electric power is recovered from the ejection head 50 to the power source having the highest voltage value from among the power sources which generate voltage values lower than the driving voltage by a certain extent. In this configuration, even though the voltage values generated by the respective power sources are not stable, application of the adequate driving voltage to the ejection head 50 is achieved while reducing the power consumption.

D-3. Third Modified Embodiment

In the embodiments described above, the description is given on the basis of the assumption that the driving voltage to be applied to the ejection head 50 is inputted as is to the operational amplifier Opamp to perform the negative feedback control. However, the driving voltage may be inputted to the operational amplifier Opamp after having divided once instead of inputting the same directly to the operational amplifier Opamp.

Figure 13:
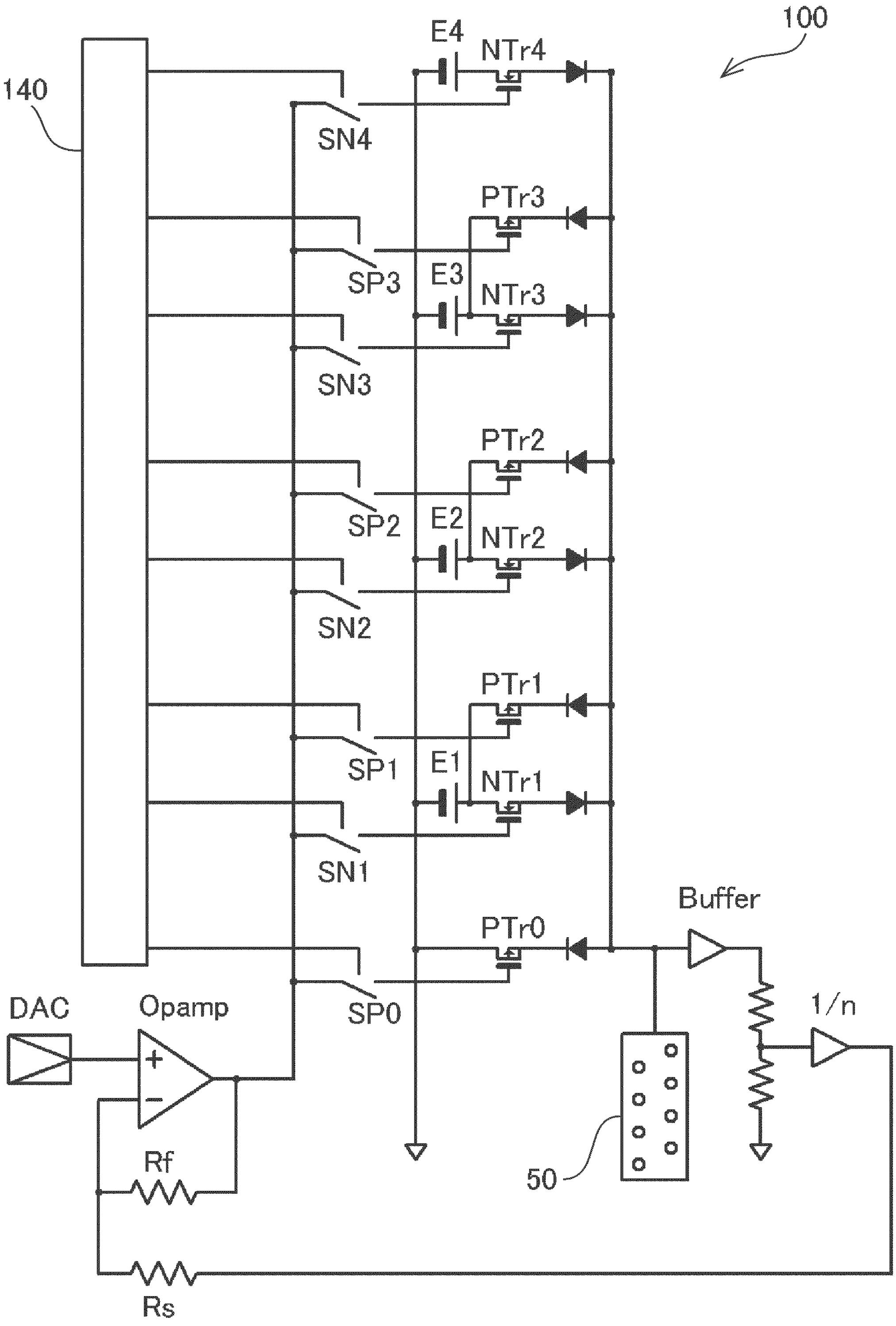
FIG. 13 is an explanatory drawing illustrating an example of the ejection head driving circuit according to a third modified embodiment.

FIG. 13 is an explanatory drawing illustrating an example of the ejection head driving circuit 100 according to a third modified embodiment as described above. In the ejection head driving circuit 100 shown in FIG. 13, the driving voltage applied to the ejection head 50 is inputted to the operational amplifier Opamp after having divided into 1/n by a voltage dividing circuit using resistance. In this configuration, the voltage that the DAC generates may be 1/n of the driving voltage to be applied to the ejection head 50. Therefore, control of the driving voltage having a large amount of fluctuations is enabled using the DAC having a small output range.

D-4. Fourth Modified Embodiment

In the embodiments and the modified embodiments described above, the diodes for preventing the reverse flow are inserted between the transistors and the ejection head 50 in order to avoid the parasitic diode in the transistor from being biased forwardly and causing the reverse flow of the electric current. Therefore, the voltage drop and the power loss are generated by the internal resistances of the diodes for preventing the reverse flow. However, by connecting the NMOS-type transistors and the PMOS-type transistors in series, the diodes for preventing the reverse flow can be omitted.

Figures 14A, 14B:
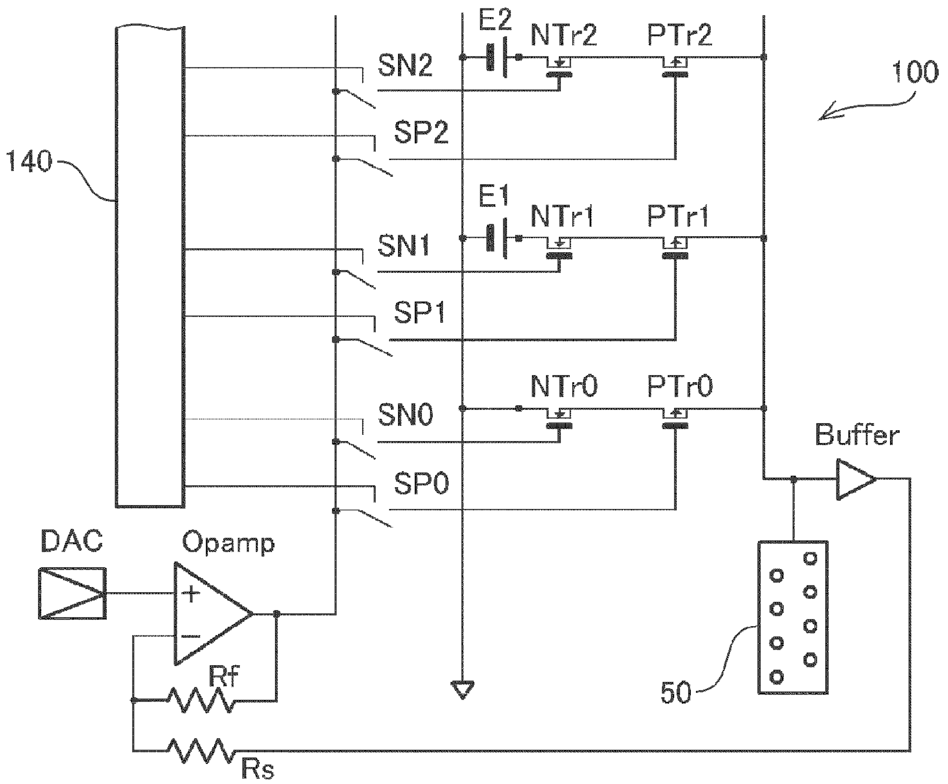
FIGS. 14A and 14B are explanatory drawings showing a state of driving the ejection head using an ejection head driving circuit according to a fourth modified embodiment.

FIG. 14A and FIG. 14B are explanatory drawings illustrating the ejection head driving circuit 100 according to a fourth modified embodiment in which the NMOS-type transistors and the PMOS-type transistors are connected in series. FIG. 14A shows a circuit diagram in which the NMOS-type transistor and the PMOS-type transistor are connected in series, and FIG. 14B shows a state in which the respective transistors are operated according to the operating state of the ejection head driving circuit 100. In FIG. 14B, the parasitic diodes of the respective transistors are also illustrated.

In this manner, by connecting the NMOS-type transistors and the PMOS-type transistors in series, and switching the operating state of the respective transistors, loading of the electric power to the ejection head 50 or recovering of the electric power from the ejection head 50 are enabled. For example, when the ejection head driving circuit 100 is not operated, both the NMOS-type transistor and the PMOS-type transistor may be used as switching elements and switched to an OFF state. The NMOS-type transistor and the PMOS-type transistor are formed with the parasitic diodes respectively. However, since the directions of the parasitic diodes are directed in the opposite direction, the electric current does not flow reversely as long as the respective transistors are in the OFF state.

When the electric power is loaded from the power source unit to the ejection head 50, the transistors connected to a power source unit En+1 on the high-voltage side of the voltage applied to the ejection head 50 and a power source unit En on the low-voltage side respectively are operated as follows. First of all, the NMOS-type transistor on the high-voltage side is functioned as the switching element and is set to the ON state, while the PMOS-type transistor is functioned as an amplifier element to perform the negative feedback control. On the low-voltage side, both the NMOS-type transistor and the PMOS-type transistor are functioned as the switching element and are set to the OFF state.

In contrast, when recovering the electric power from the ejection head 50 to the power source unit, on the high-voltage side with respect to the voltage value of the ejection head 50, both the NMOS-type transistor and the PMOS-type transistor are functioned as the switching element and are set to the OFF state. On the low-voltage side, the PMOS-type transistor is functioned as the switching element and is set to the ON state, while the NMOS-type transistor is functioned as the amplifier element to perform the negative feedback control.

In this manner, by connecting the NMOS-type transistors and the PMOS-type transistors in series, and switching the operating state of the respective transistors, loading of the electric power to the ejection head 50 or recovering of the electric power from the ejection head 50 are enabled. Since the diodes for preventing the reverse flow are not necessary to be inserted, so that the occurrence of the voltage drop or the power loss due to the internal resistance of the diode can be avoided.

As described above, the invention is not limited to a configuration in which the NMOS-type transistors and the PMOS-type transistors are connected in series, and a configuration in which the two NMOS-type transistors (or PMOS-type transistors) are connected in series is also applicable as a matter of course. In such a case, the transistors may be connected in series with the respective parasitic diodes directed opposite from each other.

D-5. Fifth Modified Embodiment

Figure 15:
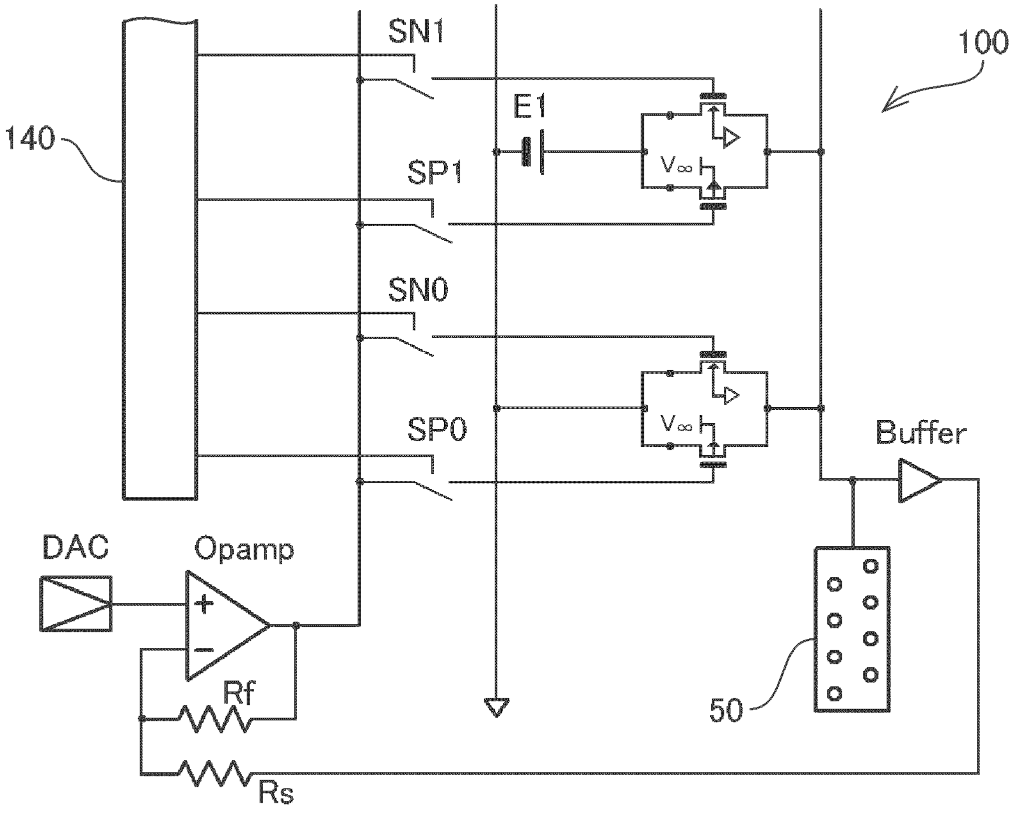
FIG. 15 is an explanatory drawing illustrating an example of the ejection head driving circuit according to a fifth modified embodiment.

In the fourth modified embodiment described above, a floating drive is necessary for at least the gate electrode of the transistor on the side of the ejection head 50 from between the NMOS-type transistor and the PMOS-type transistor connected in series, and a power source specific for the floating drive is additionally needed. However, as shown in FIG. 15, by separating a substrate of the MOS-type transistor from the source electrode and connecting the same to the power source or the ground, the floating drive is not necessary. In this configuration, since the parasitic diode is not formed in the transistor, insertion of the diode for preventing the reverse flow is not necessary.

D-6. Sixth Modified Embodiment

Although the plurality of ejection nozzles are provided in the ejection head 50, these ejection nozzles are not constantly driven, and the number of ejection nozzles to be driven simultaneously fluctuates significantly according to the image to be printed. When the number of the ejection nozzle fluctuates significantly, the ejection head driving circuit 100 which drives the ejection head 50 is also affected, so that the stable generation of the driving voltage waveform is difficult. In view of such points, a dummy load may be connected in parallel to the ejection head 50.

Figure 16:
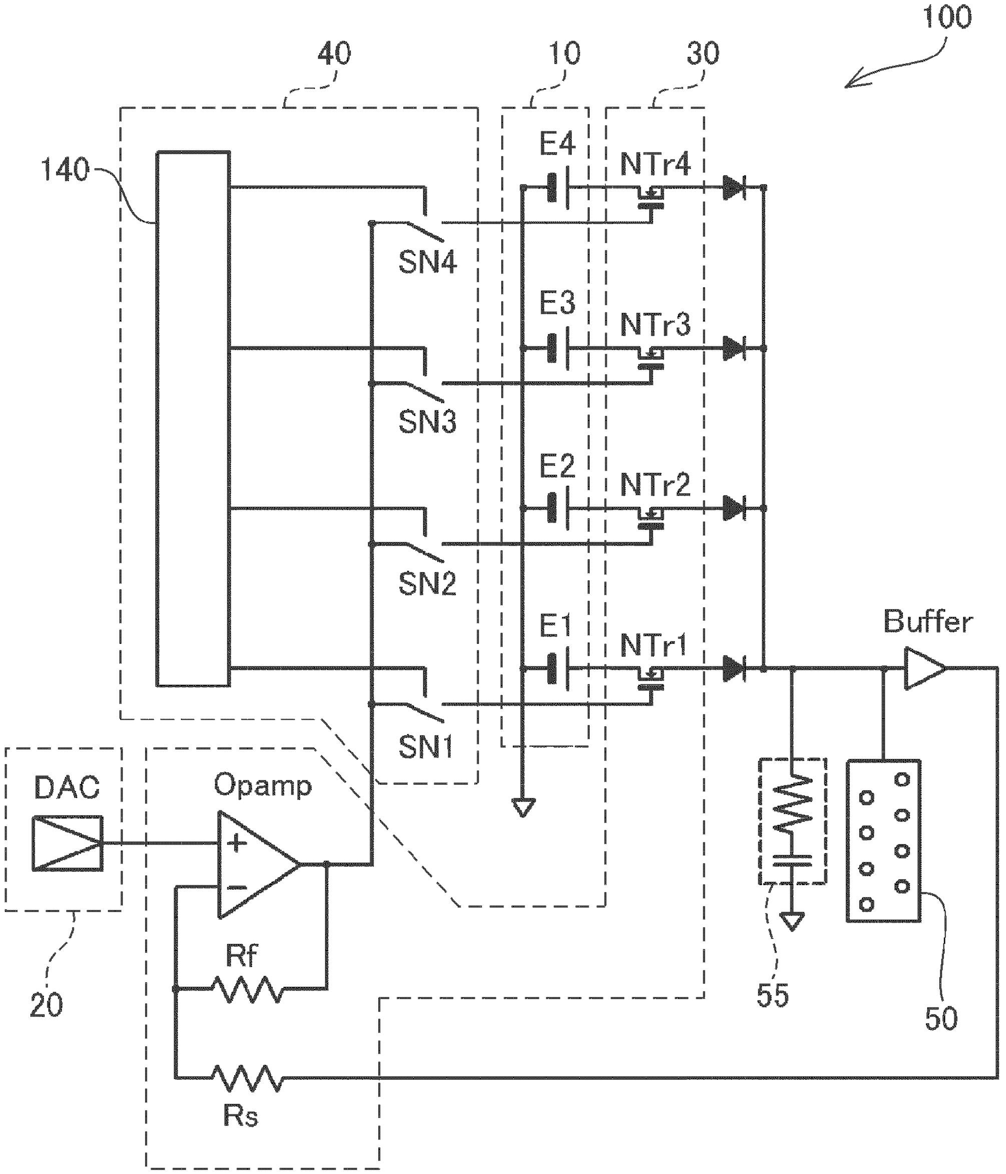
FIG. 16 is an explanatory drawing illustrating an example of the ejection head driving circuit according to a sixth modified embodiment.

FIG. 16 is an explanatory drawing illustrating an example of the ejection head driving circuit 100 according to a sixth modified embodiment in which a dummy load 55 is connected to the ejection head 50 in parallel. As illustrated, by connecting the dummy load 55 in parallel to the ejection head 50, even when the number of the ejection nozzles to be driven fluctuates significantly, the effect on the ejection head driving circuit 100 can be reduced. For example, by setting the magnitude of the load of the dummy load 55 to be substantially the same as the ejection head 50, even when the ejection nozzles driven simultaneously fluctuates between the all nozzles and no nozzle, the ratio of coefficient of fluctuation of the load becomes a half when it is considered as the entire load including the ejection head 50 and the dummy load 55. Therefore, since the effect on the ejection head driving circuit 100 is decreased, and hence the ejection head 50 can be driven with the stable driving voltage waveform.

Although the various types of ejection head driving circuit have been descried, the invention is not limited to all of the embodiments described above, and various modes may be employed without departing from the scope of the invention.

What is claimed is:

1. An ejection head driving circuit configured to supply a driving voltage waveform to an ejection head provided with ejection nozzles for ejecting fluid, the circuit comprising:

a target voltage waveform output unit configured to output a target voltage waveform supply to the ejection head;

a plurality of power source units configured to generate electric powers having different voltage values;

a plurality of negative feedback control units configured to supply the electric powers from the respective power source units to the ejection head and perform negative feedbacks on the voltage values so as to match the voltage value applied to the ejection head with that of the target voltage waveform; and a power source connecting unit configured to select and connect one of the plurality of power source units to the ejection head based on the applied voltage value or the voltage value of the target voltage waveform, and disconnect the other power source units from the ejection head, wherein the power source units are capable of storing electric power supplied from an external power source;

the power source connecting unit selects a first power source unit and a second power source unit, the first power source unit generating a higher voltage value than the voltage value applied to the ejection head or the voltage value of the target voltage waveform, the second power source unit generating a lower voltage value than the voltage value applied to the ejection head or the voltage value of the target voltage waveform;

the power source connecting unit connects the first power source unit to the ejection head when the voltage value applied to the ejection head is lower than the voltage value of the target voltage waveform, and connects the second power source unit to the ejection head when the voltage value applied to the ejection head is higher than the voltage value of the target voltage waveform; and a load connected in parallel to the ejection head and capable of storing electric power supplied from an external power source; wherein the power source units are capable of storing electric power supplied from an external source; and the power source connecting unit connects the selected power source unit to the ejecting head and the load.

2. A fluid jet printing apparatus comprising the ejection head driving circuit according to claim 1.

3. A method of driving an ejection head by supplying a driving voltage waveform to an ejection head provided with ejection nozzles to eject fluid, the method comprising:

outputting a target voltage waveform to be supplied to the ejection head, the target voltage waveform including a voltage increasing portion in which a voltage value increases as time elapses, a voltage maintaining portion in which the voltage value stays, and a voltage decreasing portion in which the voltage value decreases as time elapses;

generating electric powers of different voltage values from a plurality of power source units;

selecting one of the plurality of power source units on the basis of the voltage value applied to the ejection head or the voltage value of the target voltage waveform; and performing a negative feedback on the voltage value received from the selected power source unit so as to match the voltage value applied to the ejection head with that of the target voltage waveform, wherein the power source units are capable of storing electric power supplied from an external power source;

the power source connecting unit is selected from a first power source unit and a second power source unit, the first power source unit generating a higher voltage value than the voltage value applied to the ejection head or the voltage value of the target voltage waveform, the second power source unit generating a lower voltage value than the voltage value applied to the ejection head or the voltage value of the target voltage waveform; and the first power source unit is connected to the ejection head when the voltage value applied to the ejection head is lower than the voltage value of the target voltage waveform, and the second power source unit is connected to the ejection head when the voltage value applied to the ejection head is higher than the voltage value of the target voltage waveform.

* * * * *